US006545967B2

(12) United States Patent
Kubokawa

(10) Patent No.: US 6,545,967 B2
(45) Date of Patent: Apr. 8, 2003

(54) DISK CHANGER

(75) Inventor: Nobuyuki Kubokawa, Tokyo (JP)

(73) Assignee: Tokyo Pigeon Co., Ltd., Tokyo (JP)

( * ) Notice: Subject to any disclaimer, the term of this patent is extended or adjusted under 35 U.S.C. 154(b) by 0 days.

(21) Appl. No.: 09/326,808

(22) Filed: Jun. 4, 1999

(65) Prior Publication Data

US 2002/0097656 A1 Jul. 25, 2002

(30) Foreign Application Priority Data

Jun. 8, 1998 (JP) .......................................... 10-175393

(51) Int. Cl.[7] .......................... G11B 33/02; G11B 17/10
(52) U.S. Cl. ..................................................... 369/77.1
(58) Field of Search ........................ 369/36, 75.1, 75.2, 369/77.1, 77.2, 178, 191, 30.92

(56) References Cited

U.S. PATENT DOCUMENTS

| 5,327,412 A | * | 7/1994 | Lee .............................. 369/201 |
| 5,715,229 A | * | 2/1998 | Kim et al. ................... 369/192 |
| 5,793,717 A | * | 8/1998 | Morita et al. .................. 369/34 |

\* cited by examiner

Primary Examiner—George J. Letscher
(74) Attorney, Agent, or Firm—Hogan & Hartson, LLP

(57) ABSTRACT

A disk changer for a disk player capable of storing two disks and changing one of the disks while playing the other. The disk changer comprises a frame, a drawer moveable in an longitudinal direction between an eject and a stock position with respect to the frame, two carriages each for carrying a disk, two sliders for attaching the carriages to the drawer in a vertically displaced relationship and for exchanging the positions of the two carriages in the longitudinal direction between a front and a back portion of the drawer, and a disk playing part located in the back portion the frame, including a turntable and a lift mechanism for placing the disk carried by the carriage in the back portion of the drawer onto the turntable for playing. The ejecting movements of the drawer, the position exchanging movements of the sliders, and the lifting movements of the lift mechanism are synchronized and control by a single motor via a cam system. In a disk changing operation, the lift mechanism first moves a first disk from the turntable to the first carriage located in the back portion of the drawer; the two carriages then exchange positions within the drawer so that the first carriage is moved to the front portion of the drawer; the disk which is now located in the back portion of the drawer is placed onto the turntable; the drawer is then ejected, carrying the first disk in the front portion to be changed; and the drawer retreats back into the stock position after the disk is changed.

30 Claims, 28 Drawing Sheets

DISK CHANGER

BACKGROUND OF THE INVENTION

1. Field of the Invention

The present invention relates to a disk player, and more particularly to a disk player incorporating a disk changer.

2. Discussion of the Related Art

If a user wants to play a plurality of disks on a disk player, having a capacity of storing only one disk, the user must manually switch disks one after another. This manual operation is cumbersome for some users, and in addition, causes an interruption in playing A disk player, having a capacity of storing a plurality of disks, alleviates the inconvenience of having to manually switch each disk after each disk is played, but an interruption still occurs unless a stored disk can be switched with a new disk while another stored disk is playing. Some prior disk players having a capacity to store at least two disks are structured so that two disks are laid out side by side on the same thin plate; thus, when the user wants to switch one of the disks, the plate on which both disks are placed must be ejected from the player and the playing is interrupted.

In addition, prior disk players are structured so that a pickup or playing unit is placed in between the two disks which are laid out side by side on the same plate. When the user chooses a disk to play, the pickup or playing unit is moved to a corresponding location. Because the disks are laid out side by side on the same plate, the size of the plate on which two disks are placed must be at least twice the diameter of a disk. Moreover, the device must be able to move a pickup or a player, which is heavy, and thus requires a considerable amount of power. Consequently, the player becomes bigger in size and contains more complexities. As a result, the size and cost of the player become equivalent to the size and price of a player having a capacity of storing three disks, and causes such a two-disk player to be undesireable.

SUMMARY OF THE INVENTION

Accordingly, the present invention is directed to a disk player incorporating a disk changer that substantially obviates one or more of the problems due to limitations and disadvantages of the related art.

An object of the present invention is to provide a disk player capable of storing two disks and changing one disk while playing the other disk, with the disk player having a compact design and low manufacturing cost.

To achieve these and other advantages and in accordance with the purpose of the present invention, as embodied and broadly described, a disk changer for a disk player is provided, comprising a drawer having a front and a back portion defining a longitudinal direction, first and second sliders attached to the drawer and moveable in the longitudinal direction, first and second carriages each for carrying a disk, each carriage being engageable with one of the first and second sliders, wherein when both carriages are engaged with the respective slider, the cages are vertically displaced with respect to each other and moveable longitudinally between the front and back portions within the drawer, and a control mechanism for effectuating the movements of the sliders. The disk changer further has a turntable, wherein the lifting mechanism places a disk carried by the carriage located in the back portion onto the turntable for playing and removes a disk from the turntable and replaces it on to the carriage located in the back portion.

The control system comprises a master cam and effectuates simultaneous movements of the first carriage from the front portion to the back portion and the second carriage from the back portion to the front portion, and a subsequent movement of the lifting mechanism to place a disk carried by the first carriage on to the turntable during a rotation of the master cam in a first direction. The movements in the opposite direction, i.e., a movement of the lifting mechanism to replace a disk carried by the turntable on to the first carriage, and subsequent simultaneous movements of the first carriage from the back portion to the front portion and of the second carriage from the front portion to the back portion are performed during a rotation of the master cam in a second direction.

Because the disk player of the present invention allows a stored disk to be taken out while the second disk is playing, interruption of playing is minimized. Moreover, because there is one carriage for each disk, disk jam caused by piling another disk on top of the disk that is playing can be prevented. In addition, to reduce the size and price and simplify the manufacturing process, the disk player is preferably equipped with a single motor that can continuously and smoothly perform all movements, from the placement of two disks to the ejection of a disk.

Another aspect of the present invention is a method for changing disks, comprising removing a first disk from a turn table where the first disk was played to place it on a first carriage located in a back portion of the drawer, simultaneously moving the first carriage from the back portion to the front portion and moving a second carriage carrying a second disk from the front portion to the back portion, wherein the first and second carriages are vertically spaced apart during the movements, and placing the second disk carried by the second carriage on to the turn table.

The disk changer of the present invention may be incorporated in optical disk players such as CD, CD-ROM, or DVD players, or players using other types of information storage media, such as magnetic disks or the like.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

DETAILED DESCRIPTION OF PREFERRED EMBODIMENTS

Figure 1:
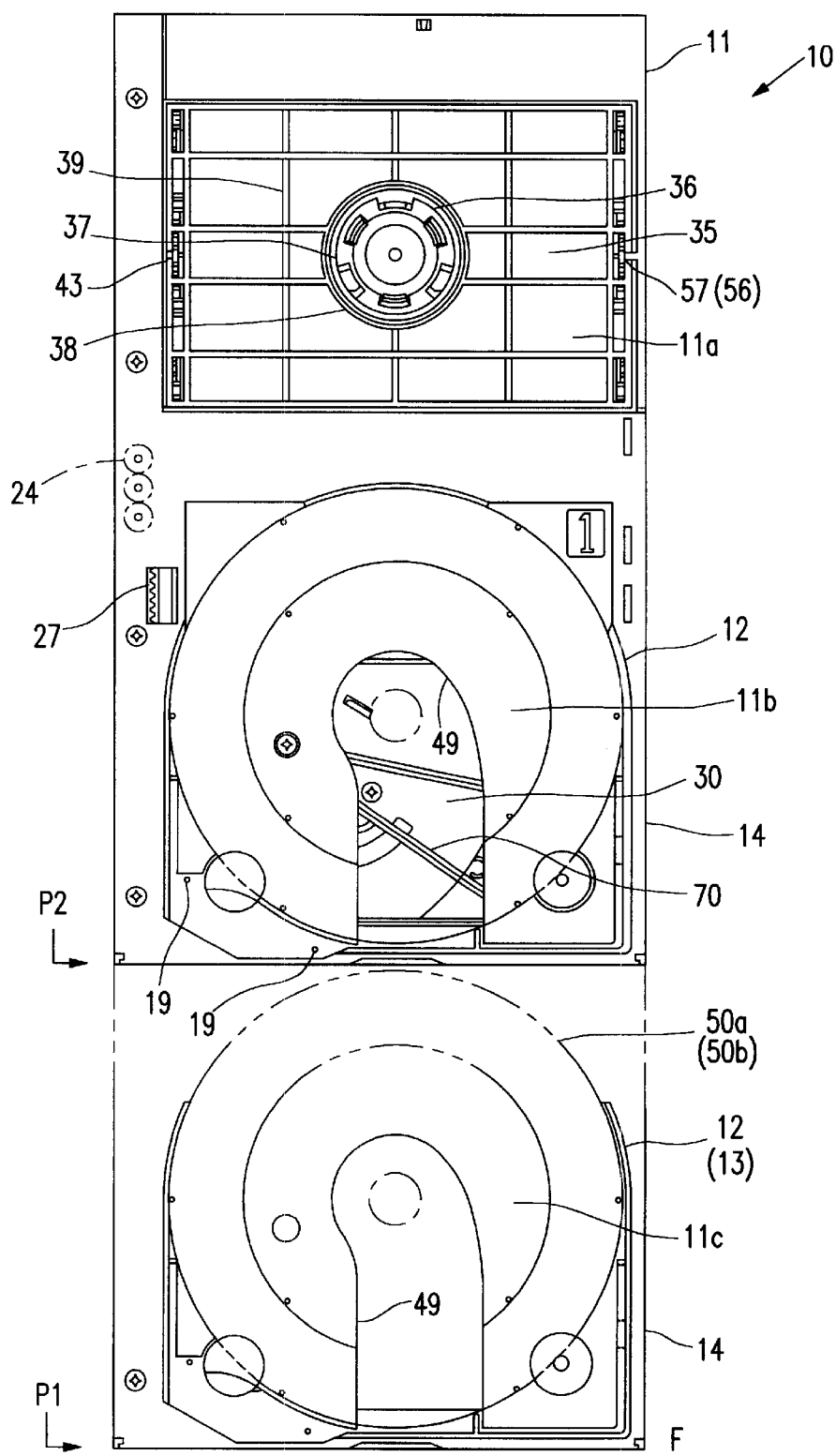
FIG. 1 is a plan view of the disk player according to an embodiment of the present invention which illustrates a condition in which the drawer is pulled.
Figure 2:
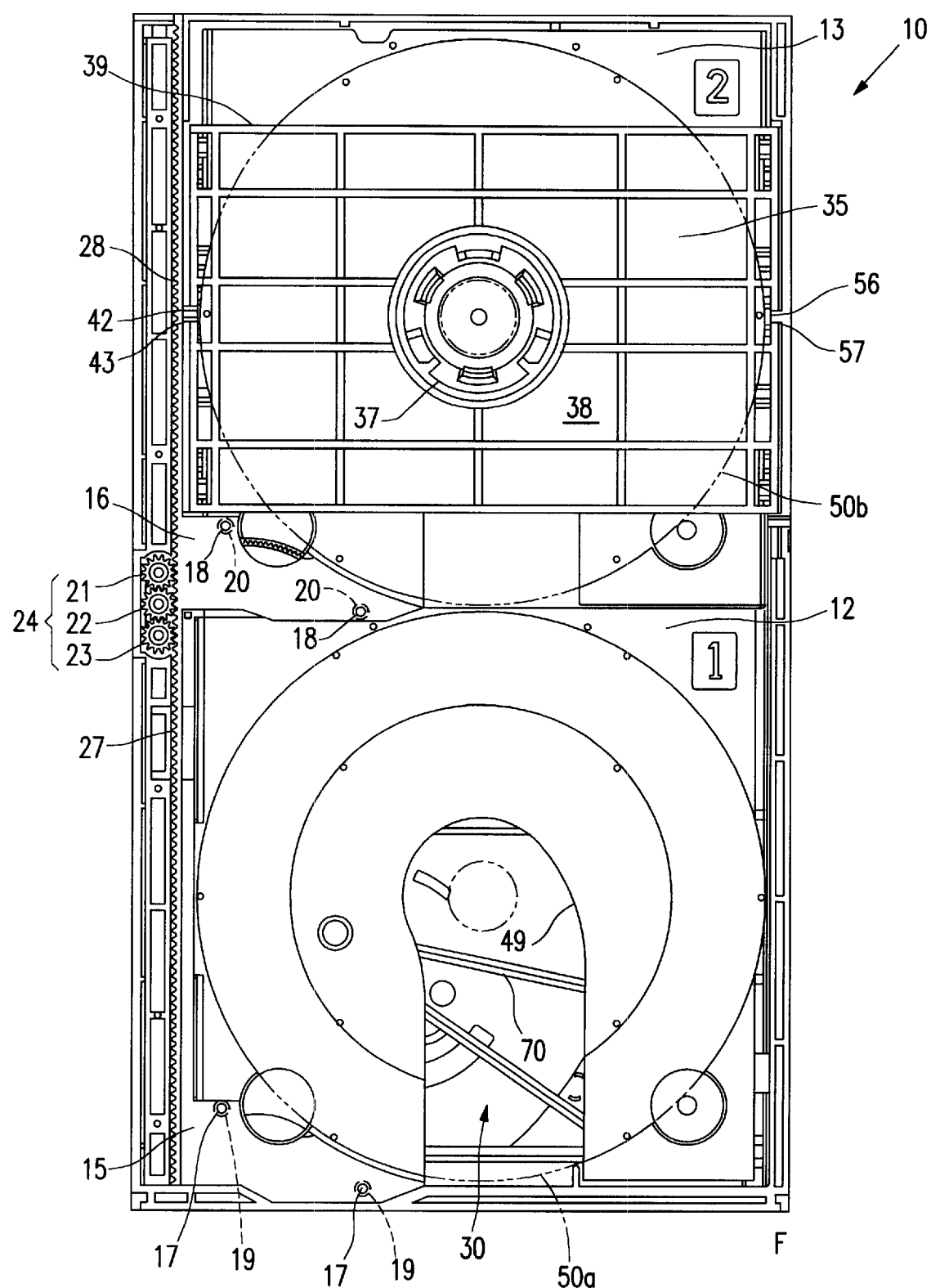
FIG. 2 is a plan view the disk player of FIG. 1, illustrating the drawer without a frame.

The actual features of the present invention relating to a disk player and more particularly to a disk changer will be described hereafter in reference to the figures. FIGS. 1–2 are plan views of a disk player 10 of an embodiment of the present invention. The disk player has a frame 11 and a single drawer 14, which is normally located within the frame. Disks 50a and 50b are placed in an upper carriage 12 and a lower carriage 13, respectively, and can be pulled into or out of the disk player 10 using the drawer 14. FIG. 1 shows an eject position P1, which denotes a position in which the drawer 14 is pulled out in the outmost position from the disk player 10, and a stock position P2, which denotes a position in which the drawer is stored in the disk player 10. A disk may be located in a playing position generally indicated as 11a, a stock position generally indicated as 11b, and an ejected position outside of the frame generally indicated as 11c. Preferably, the playing position 11a is located toward the back of the frame and the stock position is located toward the front of the frame. (For the purpose of explaining, the side of the disk player 10 where P1 is located, is the front side, F.)

Inside the drawer 14, there are two layers of sliders, 15 and 16, which are connected to the upper and lower carriages 12 and 13 to move the carriages back and forth in a straight line in the direction parallel to a line connecting the eject position P1 and the stock position P2 (the longitudinal direction), but in the opposite directions from each other. There are two communicating pins 17 and 18, which protrude from the lower face and are positioned at the front side of each of the upper and lower layers of the sliders, and communicating holes 19 and 20, both of which are located on the carriages 12 and 13 at positions corresponding to the communicating pins 17 and 18, respectively. The communicating holes 19 and 20 can be respectively engaged with the communicating pins 17 and 18 from below, and as a result, carriages 12 and 13 move in a straight line together with the corresponding sliders 15 and 16. Preferably, the upper carriage 12 is only engaged with the upper slider 15 and the lower carriage 13 is only engaged with the lower slider 16. As will be explained later, the upper slider is preferably not engaged with the lower carriage or vice versa.

Figure 3:
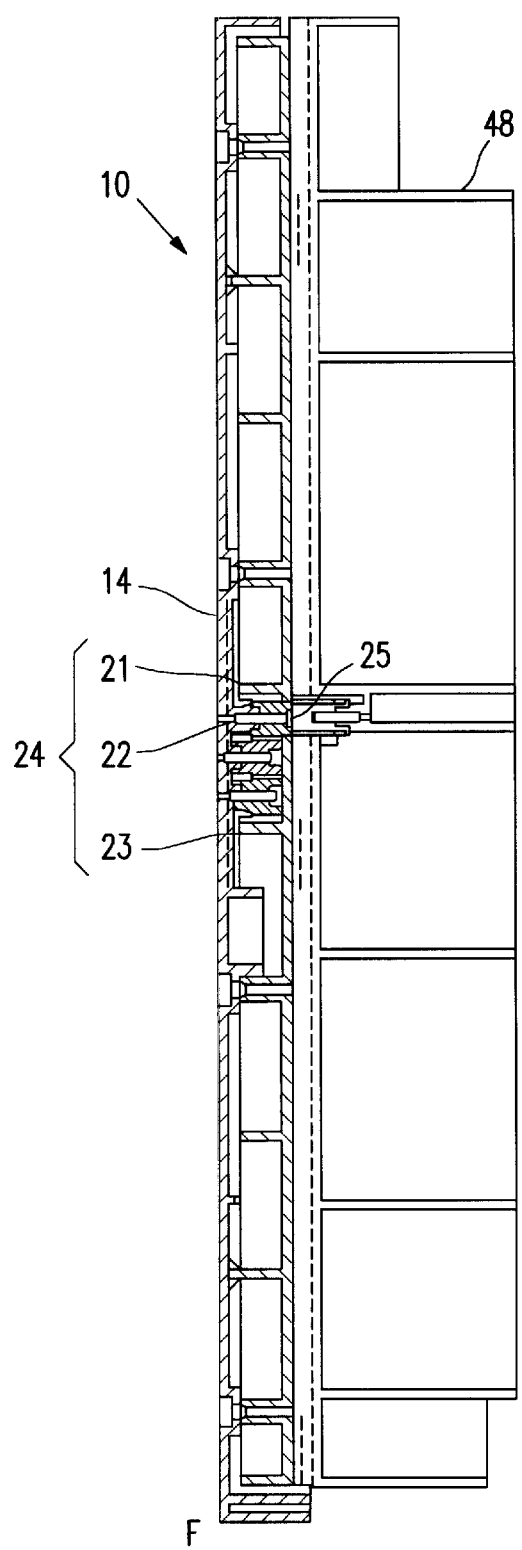
FIG. 3 is a side view of the line of gears located on the drawer of the disk player
Figure 4:
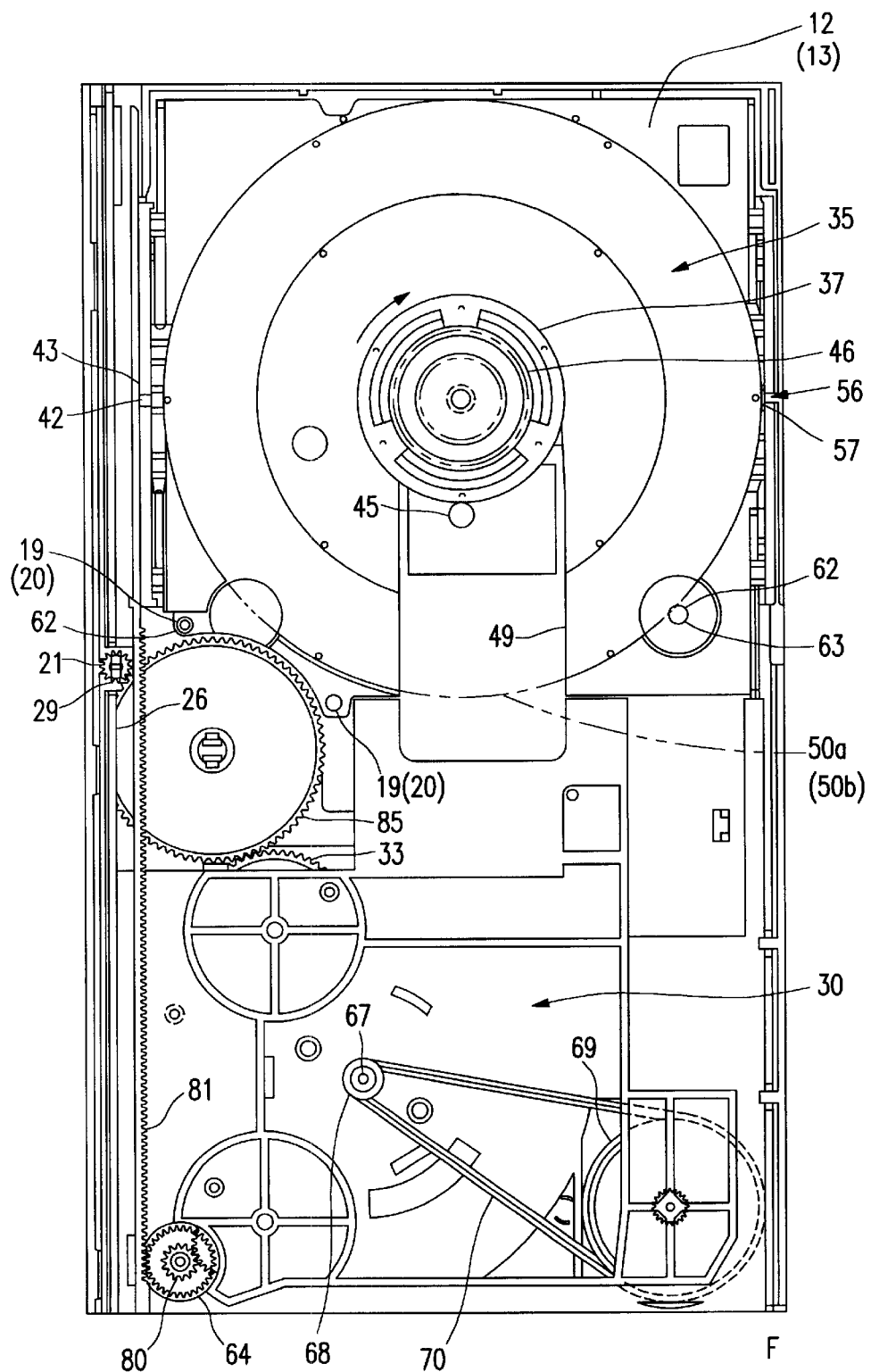
FIG. 4 is a plan view the disk player of FIG. 1, illustrating relative positions of the carriage driving part, the drawer interlocking rack and the disk playing part.
Figure 5:
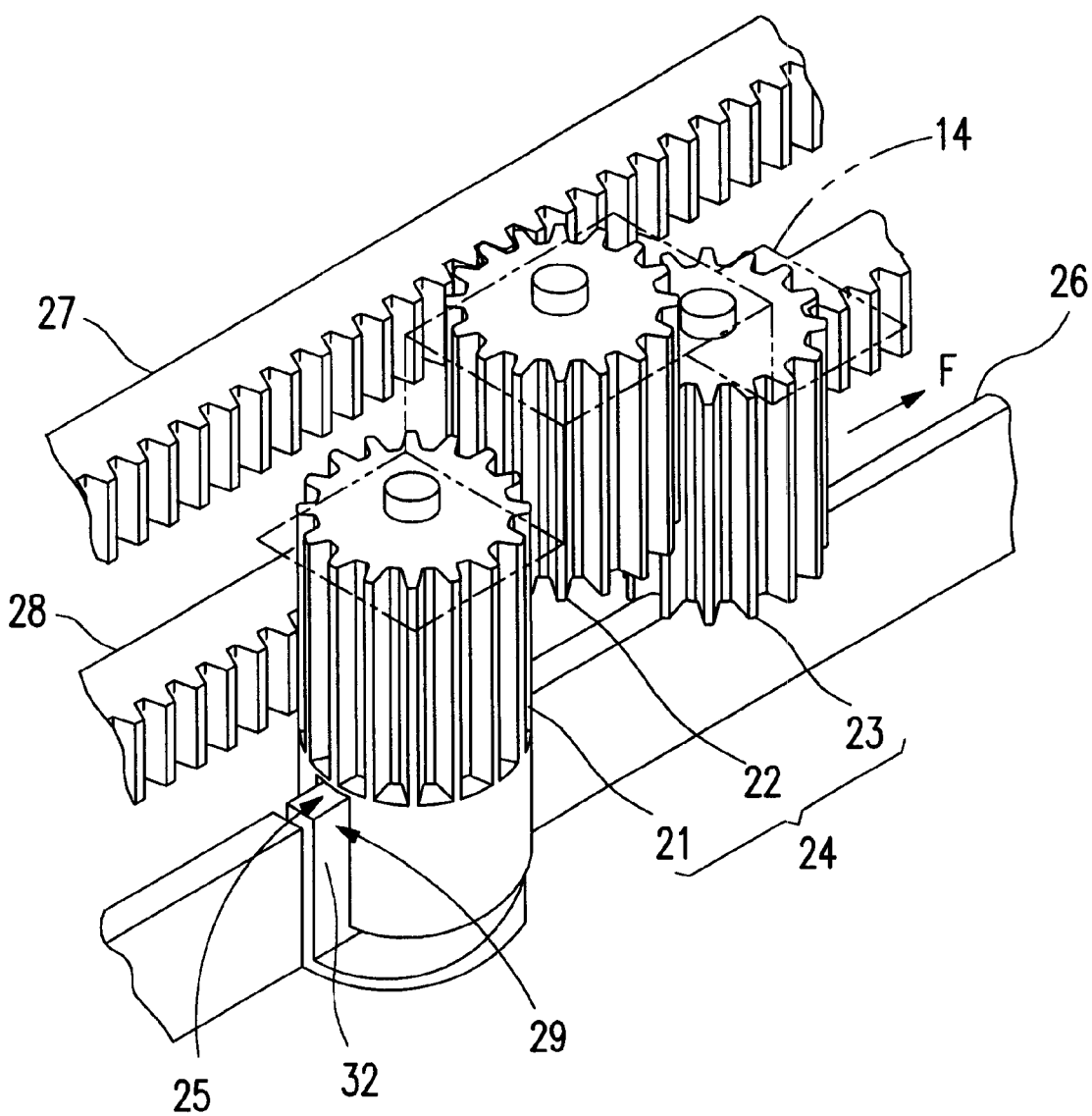
FIG. 5 is a three-dimensional view illustrating the relative positions of the line of gears located in the drawer, the rack of the slider, and the guide rail.

The movement of the drawer 14 between the eject position P1 and the stock position P2 and the exchange of positions of the disk carriages 12 and 13 is now described with reference to FIGS. 2–5. As shown in FIG. 2, on one side of the moving direction of the drawer 14, there are three pinions 21, 22 and 23, which have the same radius, and together constitute a line of gears 24. As shown in FIGS. 3 and 5, a clutch groove 25 is vertically provided on the driving pinion 21 which is located at the end of the line of gears 24, and as shown in FIGS. 4 and 5, the pinion 21 freely slides on a guide rail 26. Consequently, when the drawer 14 moves in a straight line, the driving pinion 21 maintains a striding position over the guide rail 26 and moves along with the drawer 14. During this movement, the driving pinion is restrained by the guide rail 26 and does not rotate, and accordingly, the middle pinion 22 and the interlocking pinion 23 both do not rotate.

Racks 27 and 28 are attached to the upper and the lower sliders 15 and 16, respectively. Among the line of gears 24, the middle pinion 22 is engaged with the upper rack 27, while the driving pinion 21 and the interlocking pinion 23 are engaged with the lower rack 28. During the time in which the drawer 14 moves in a straight line from the eject position P1 to the stock position P2, the driving pinion 21's rotation is restrained due to the maintenance of the engagement between the clutch groove 25 and the guide rail 26, and thus, the corresponding positions of the sliders 15 and 16 do not change. This relationship between the line of gears 24, guide rail 26 and the racks 27 and 28 are illustrated in FIG. 5.

According to FIG. 5, a cessation part 29 is located on the guide rail 26, and an engaging clutch board 32 extends from a slider moving pinion 31 of a carriage driving part 30 (not shown), which will also be described later, in a manner of supporting the cessation part 29. As shown in FIG. 2 in which the drawer 14 is not drawn but is located inside the disk player at the stock position P2, the driving pinion 21 which slides on the guide rail 26 stops at the cessation part 29. Then, the clutch groove 25 of the driving pinion is engaged with the engaging clutch board 32. Accordingly, a clutch engagement is accomplished.

Therefore, only when the drawer 14 is at the stock position P2, the above described clutch engagement is accomplished, and the driving pinion 21 interlockingly rotates with the slider moving pinion 31, and additionally, the sliders 15 and 16 can be moved via the racks 27 and 28 which are engaged with the line of gears 24. The driving pinion 21 and the middle pinion 22 rotate in opposite directions from each other, whereas the driving pinion 21 and the interlocking pinion 23 rotate in the same direction, Accordingly, the slides 15 and 16 move in opposite directions from each other in a straight line, thereby allowing the changes in the positions of the sliders from front to back or vice versa.

When the drawer 14 is pulled out to the eject position P1, one of the sliders 15 and 16 is at the foremost position of the straight moving line, while the other one is at the very back of the straight moving line. Thus, only one of the two sliders 15 and 16, contained inside the drawer 14, is pulled out of the disk player 10, and a disk is placed on or changed only with respect to the carriage that is engaged with the slider contained inside the drawer 14 that is pulled out of the disk player 10. In this manner, when the drawer 14 is in the midst of being pulled out or is at the eject position P1, the driving pinion 21 is located apart from its clutch engagement position with the slider moving pinion 31, and thus, the rotation on the guide rail 26 is inhibited. Consequently, the switching of the positions of the sliders 15 and 16 cannot be achieved.

Figure 6:
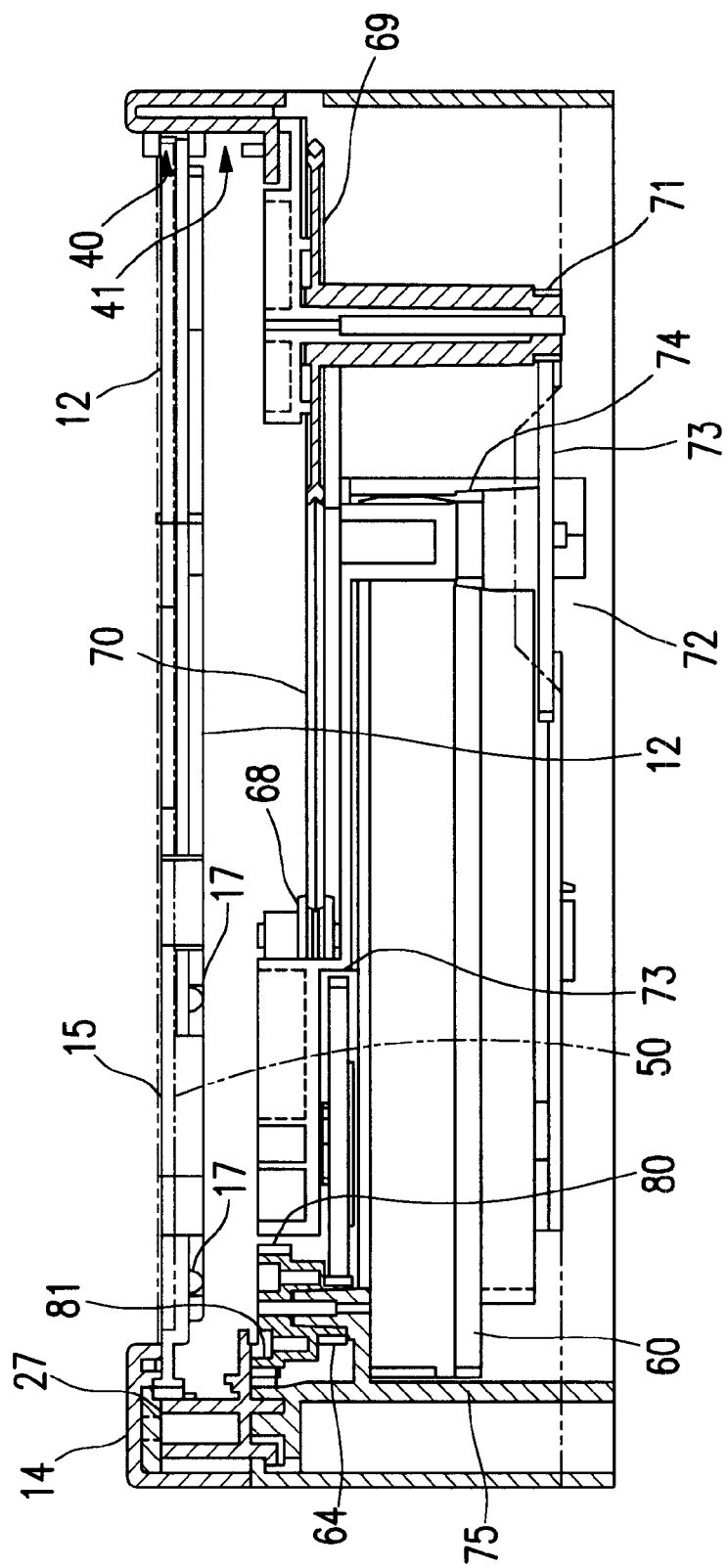
FIG. 6 is a front view of the disk player of FIG. 1, illustrating the relative positions of the upper slider and the master cam.
Figure 7:
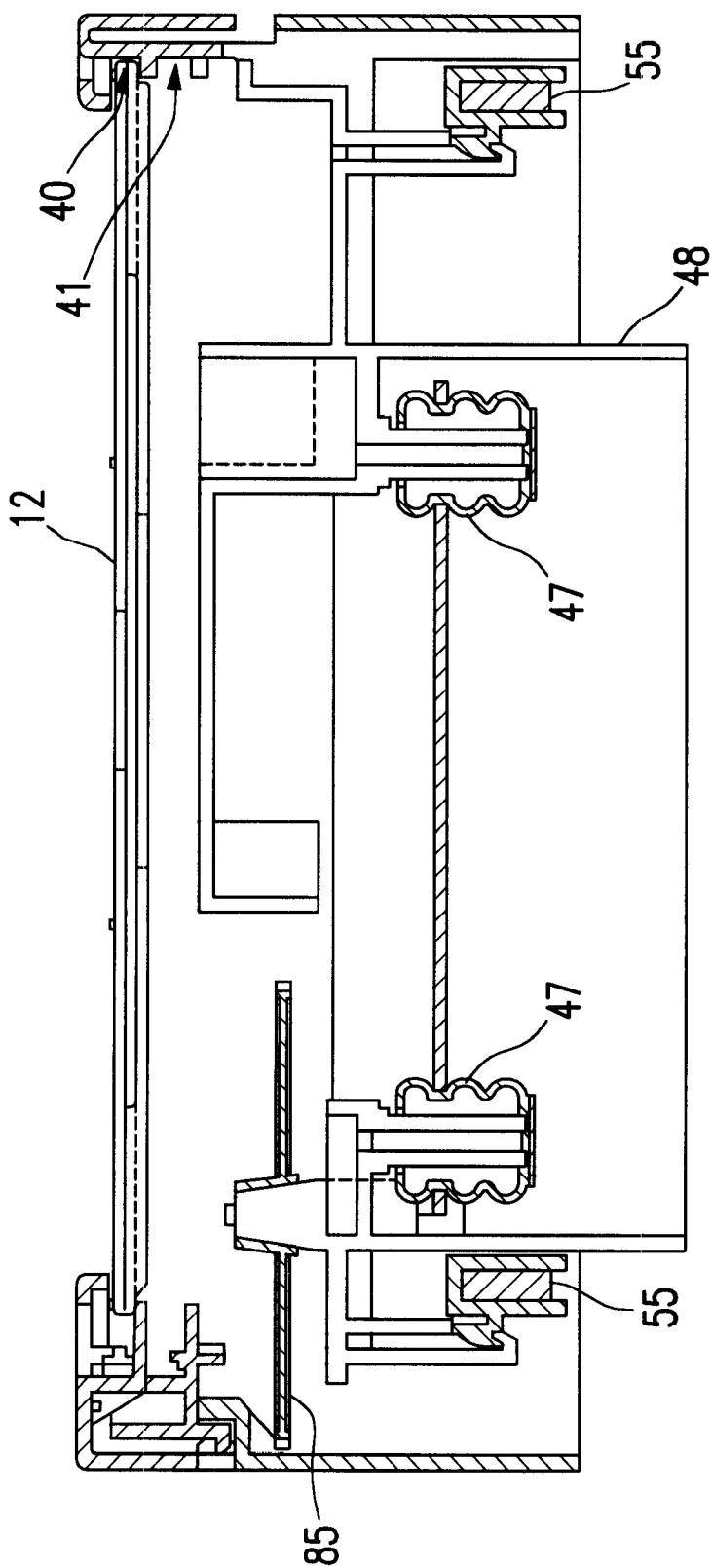
FIG. 7 is a front view of the disk player, illustrating the lift part and the damping part of the disk player.
Figure 9:
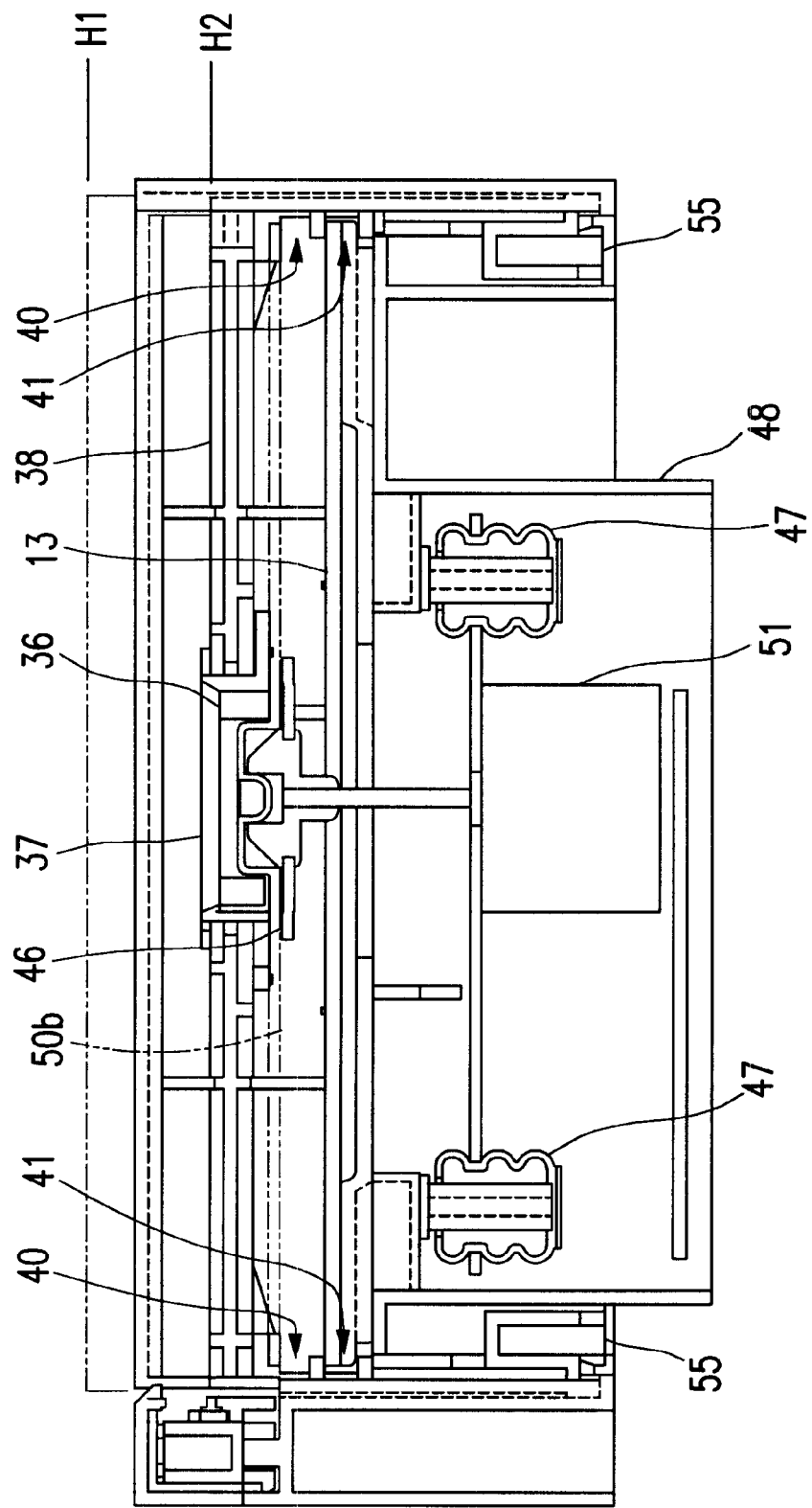
FIG. 9 is a front view of the disk player, illustrating the relative positions of the lift, disk clamper, turntable, and spindle motor.

As shown in FIGS. 1 and 2, a disk playing part 35, including a playing position 11a into which the disk is carried into from a disk stock position 11b, plays a disk which has been placed onto a turntable 46 at the playing position. As shown in FIG. 9, the disk playing part 35 includes a disk clamper 37, a lift 38, and a magnet 36, wherein the disk clamper 37 of the magnet 36 is supported by an upper frame 39 of the lift 38, in a way that the disk clamper 37 is lightly bounded so that a slight upper movement is allowed, and is free to move up and down along with the lift 38, which is operated by the carriage driving part 30. As shown in FIGS. 6 and 7, there are two layers of shelves 40 and 41 protruding from the inner side surface of the lift 38. As shown in FIG. 6, the upper shelf 40 stores the upper carriage 12 which is carried in as engaged with two communicating pins 17, which protrude from the bottom surface of the slider 15. The lower shelf 41 stores the lower carriage 13, which is carried in as engaged with two communicating pins 18, which protrude from the bottom surface of the slider 16.

Figure 8:
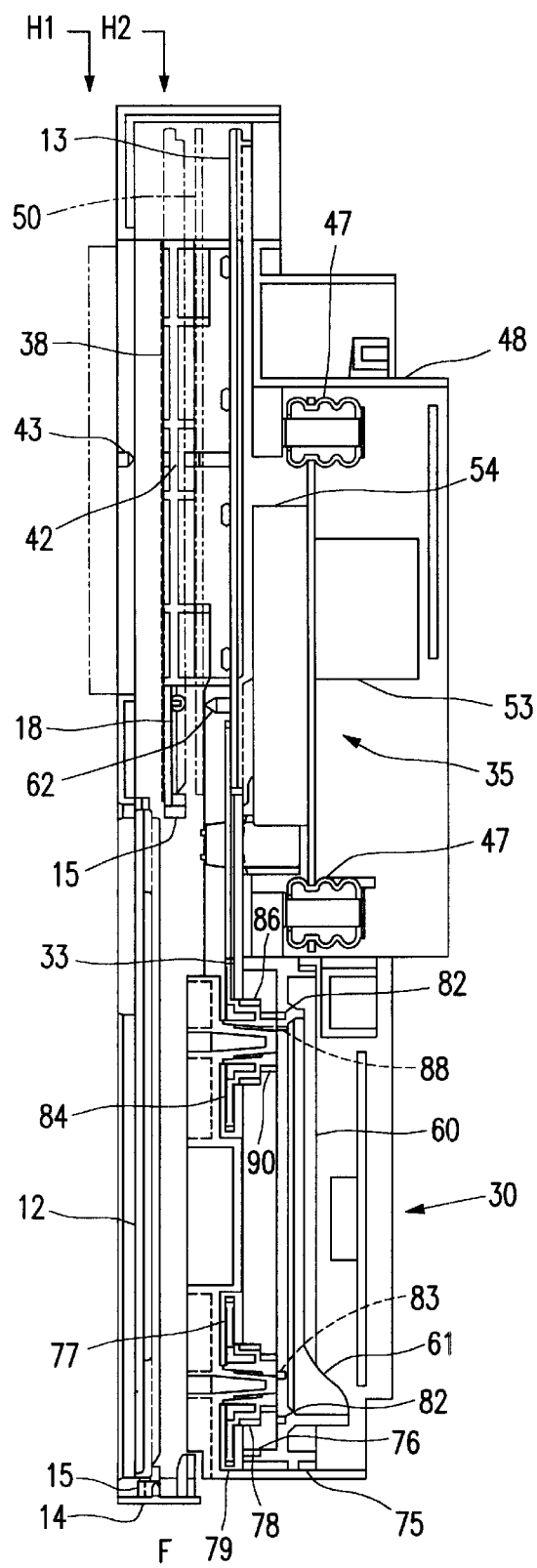
FIG. 8 is a side view of the disk player, illustrating the lift part and the damping part of the disk player.

The up and down movement of the lift 38 will now be explained. As shown in FIG. 8, the lift 38 goes up and down ranging from a lower limit position H2 to an upper limit position H1. When the lift 38 is positioned at the upper limit position H1, a guide groove 42 which is located at a side surface of the lift 38 is engaged with a protruding part 43, which protrudes from an inner surface of the drawer 14. This engagement of the guide groove 42 and the protruding part 43 prevents a straight line movement of the drawer 14 by fixing the drawer 14 during the time in which the positions of the sliders 15 and 16 are being switched, and thus, allowing the switching of the positions of the sliders to be performed smoothly. Therefore, the drawer 14 can be pulled out of the disk player 10 only when the guide groove 42 and the protruding part 43 are disengaged, and when the lift 38, being accompanied with either the carriage 12 or 13, which is engaged with one of the sliders 15 and 16, is located at the lower limit position H2. In this manner, the carriages 12 and 13 are never switched, or in other words, the same carriage always carries the same disk.

Upon the completion of the lift's up and down movement, the disk which is to be played is placed on the turntable and is played in the following manner. As shown in FIGS. 7–9, a pickup moving mechanism 54 and a turntable 46 in the disk playing part 35 are supported by a chassis 47 of the disk player 10 via a vibration preventing damper 47. A disk 50b is carried in by the carriage 13, supported by the turntable 46 and set by the disk clamper 37, as shown in FIG. 9. Then the disk 50b along with the turntable 46 is rotated at a fast pace by a spindle motor 51, which is directly connected to the turntable 46. Similarly, a disk 50a which is carried in by the carriage 12 is rotated in the same manner.

Figure 12:
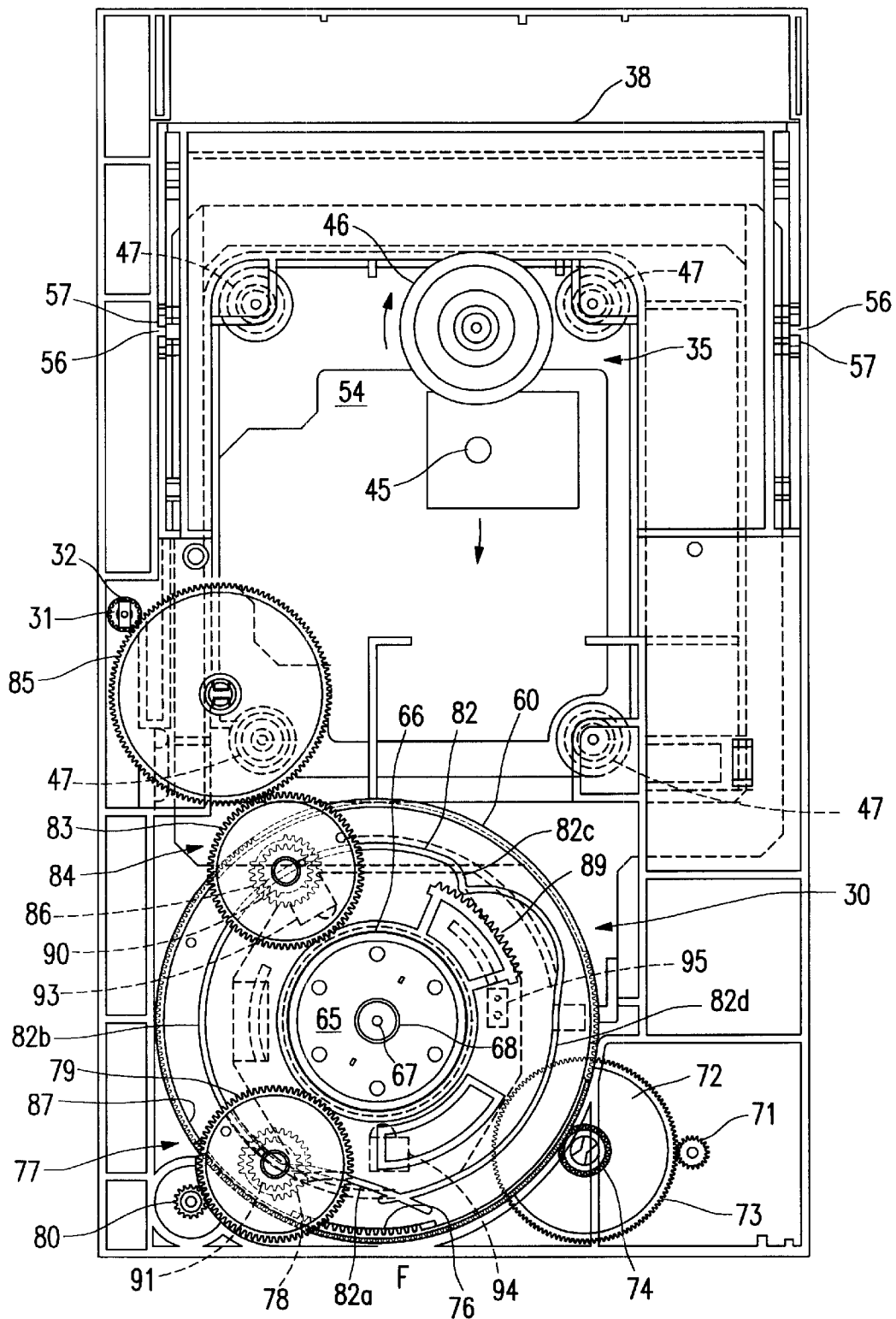
FIG. 12 is a plan view of the disk player, illustrating the driving motor, master cam, and the line of gears.

As shown in FIG. 1 and FIG. 2, each carriage 12 or 13 defines an opening 49, through which the pickup 45 and the turntable 46 temporarily exits. FIGS. 4 and 12 show a mechanism in which the pickup 45 is first moved by the moving mechanism 54, which is driven by a pickup control motor 53. The pickup 45 is then moved in a direction of a radius of the disk 50a or 50b, which is rotating at a fast pace and is supported by the turntable 46. Finally the pickup 45 plays the signal recorded onto the disk 50a or 50b via the opening 49 using a mechanism known in the art, the explanation of which is omitted here.

Figure 10:
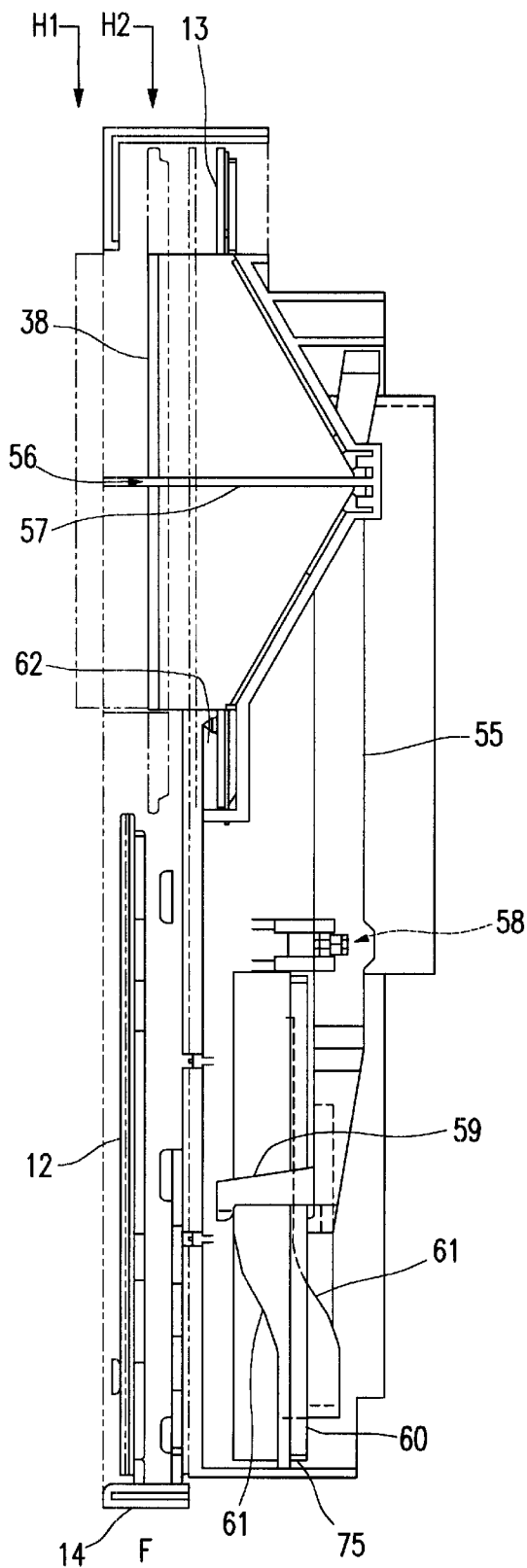
FIG. 10 is a side view of the disk player, illustrating the relative positions of the lever and the master cam.

The up and down movement of the lift 38 via a lever 55 is now explained in reference to FIG. 10. The lift 38 is pivotally mounted at a back end part of the lever 55 in a way that there is room for the lever 55 to be able to slightly vibrate. A guide rib 57 protruding from a chassis 48 is engaged with a sliding groove 56 provided on the side surface. Due to the lever's vibration and the engagement of the guide rib 57 and the sliding groove 56, the lift 38 moves up and down without stopping between the upper limit position H1 and the lower limit position H2 in a direction perpendicular to the rotating surface of the turntable 46. A cam surface 61 is smoothly and continuously protruding from a side surface of the master cam 60. The cam surface is provided on the frontal part of a cam follower 59. The lever 55 is supported from top and bottom by the cam follower 59 and a pivot 58 at which the lever 55 is pivotally mounted. In such a manner, the master cam 60 moves up and down the lift 38, which is engaged at the back end part, and in addition, is structured to stop at both the upper limit position H1 and the lower limit position H2.

Figure 11:
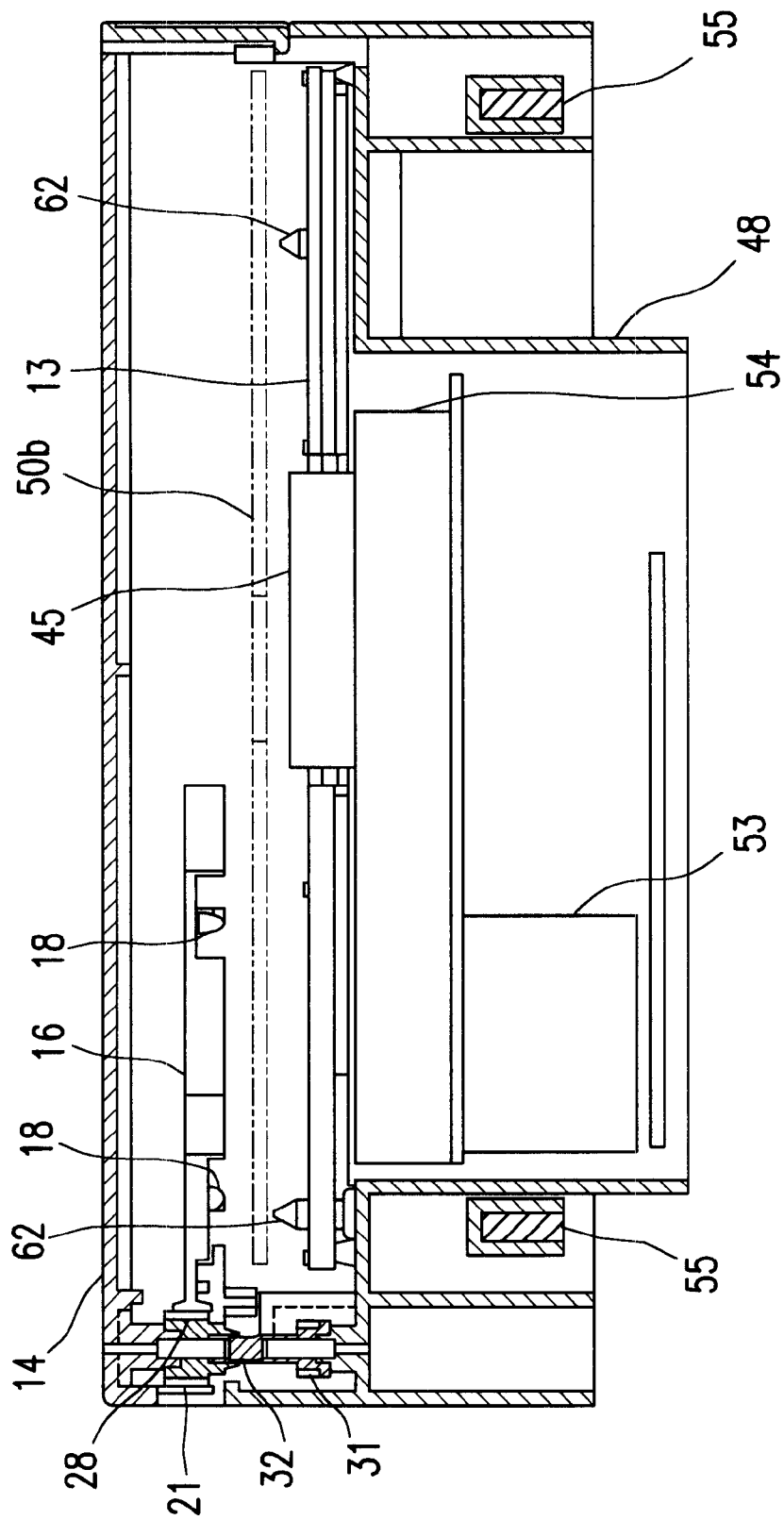
FIG. 11 is a side view of the disk player, illustrating the lower slider, carriage positional determining pins and the pickup moving mechanism.

FIG. 11 shows a state in which the lower carriage 13 is carried by the lower slider 16, stored by the lower shelf 41 of the lift 38, and moved to the lower limit position H2. In such a process, the lower carriage 13 is disengaged from its engagement with the communicating pin 18 initially. Then, in the middle of the descent, the lower carriage 13 places the disk 50b on the turntable 46. Finally, position deciding pins 62, which protrude from the top of the chassis 48, are engaged with engaging pores 63, in order to correctly fix the positions of the reengagement.

When the lift 38 descends toward the lower limit position H2, the disk 50b, which is placed on the top surface of the carriage 13, is prevented from descending further by the turntable 46, and thus, the lower surface of the disk 50b and the upper surface of the carriage 13 are separated from each other. When the lift 38 reaches the lower limit position H2, the disk 50b is prevented from a further descent by, and is placed on, the turntable 46. Then, as shown in FIG. 9, the disk 50b is placed on the turntable 46 with a method known in the art, such as by using a disk clamper 37. Similarly, the disk 50a, which is carried by the carriage 12, is moved in the same manner as the disk 50b.

As shown in FIG. 12, the master cam 60, which consists of cams and gears, controls the horizontal and vertical movements of the carriages 12 and 13, as explained above. The master cam 60 is supported by a circular cylinder 66 which is fixed at an outer circumference of one driving motor 65, and is able to freely rotate. As shown in FIG. 4, a driving pulley 68, which is directly connected to an output axis 67 of the driving motor 65, and a driven pulley 69 which is positioned at a frontal left side of the disk player 10 are connected by a belt 70. A driving pinion which shares the axis, and rotates, with the driven pulley 69, engages with a big gear 73 of a speed reducing gear pair 72, and the a small gear 74 engages with exterior teeth of the master cam 60. As a result the master cam 60 rotates within a range of 270 degrees in a clockwise or a counterclockwise direction as shown in FIG. 6.

Figure 14A:
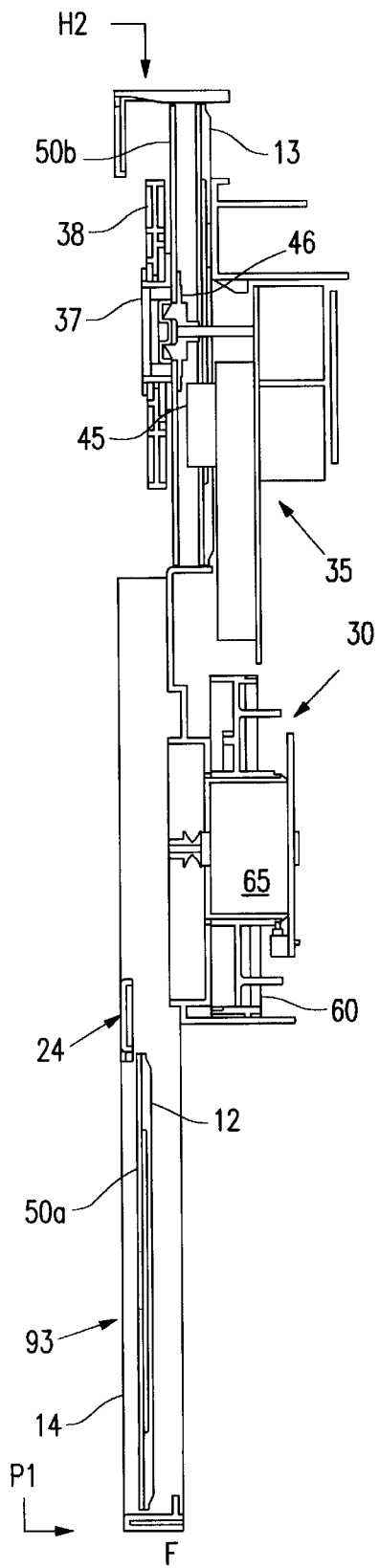
FIGS. 14–19 are side views explaining the operation of the disk player of FIG. 1.
Figure 14B:
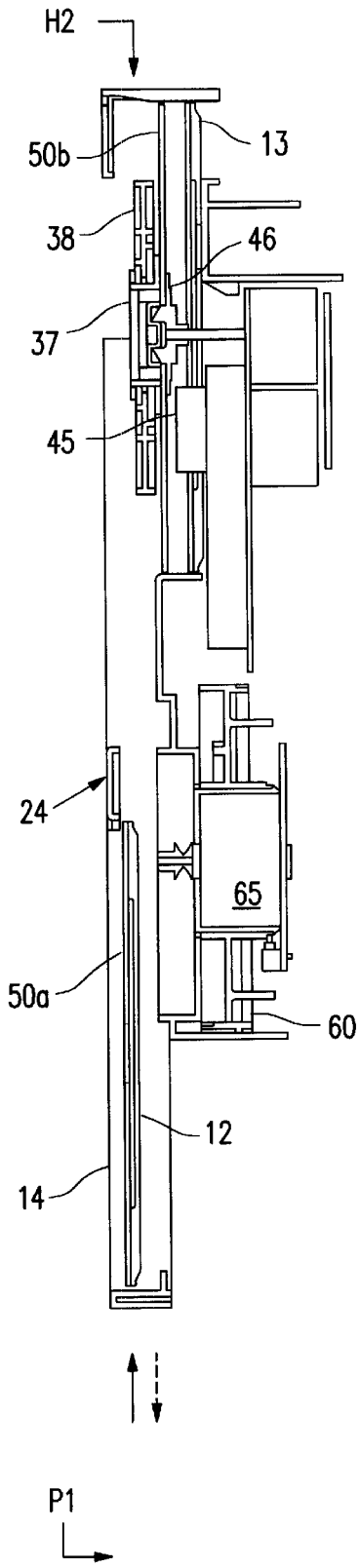
Figure 15:
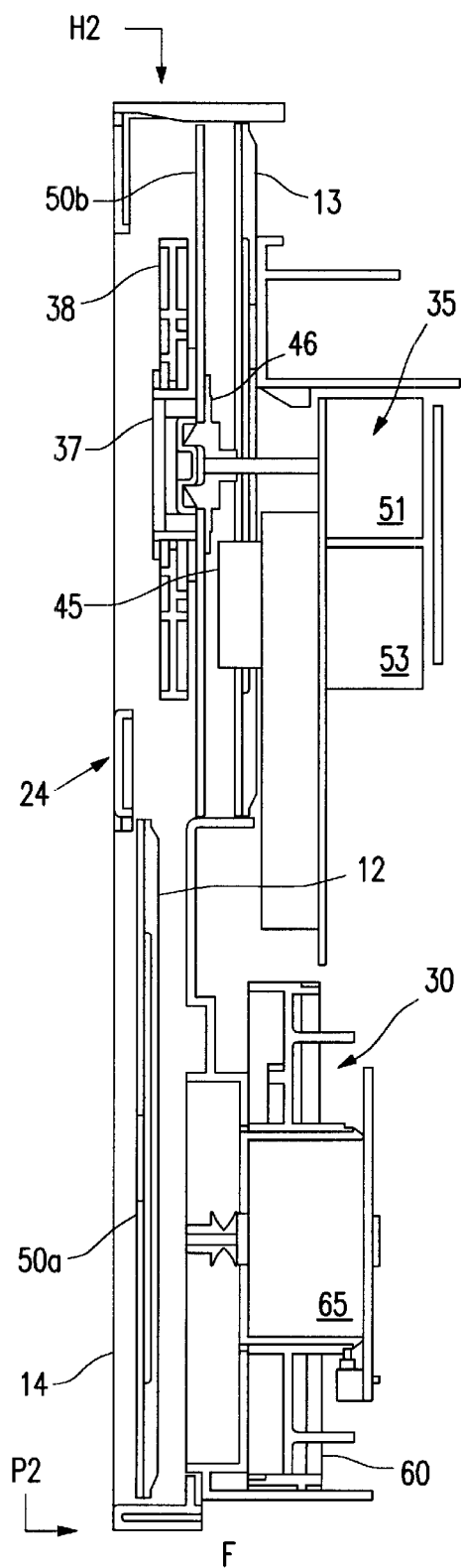

The movement of the carriages 12 and 13 while the master cam 60 rotates approximately 270 degrees in one direction is now explained with reference to FIGS. 14–19. In these figures, the solid lines with arrows denote the moving direction of the carriage when the master cam 60 is rotated in a counterclockwise direction, whereas dotted lines with arrows denote the moving direction of the carriage when the master cam 60 is rotated in a clockwise direction. In FIG. 14(*a*), the drawer 14 containing the disk 50*a* on the upper carriage 12 is entirely pulled to the eject position P1, whereas the lower carriage 13 and the disk 50*b* are at the playing position. FIG. 14(*b*) shows the drawer 14 moving into the disk player 10 until it reaches the stock position P2 and is entirely contained within the disk player 10 as shown in FIG. 15. Meanwhile, the lower carriage 13 and the disk 50*b* remain at the playing position. Then, the movement of the drawer, containing the upper carriage 12 and the disk 50*a*, terminates and the lower carriage 13 starts ascending, as shown in FIG. 16(*a*), until the carriage 13 reaches the height of the turntable 46 as shown in FIG. 16(*b*). The disk 50*b*, which has been supported on the turntable is now supported by the lower carriage 13. FIG. 17(*a*) shows the process of the carriages 12 and 13, carrying disks 50*a* and 50*b*, respectively, switching places; while the upper carriage 12 moves from the stock position P2 to the playing positions the lower carriage 13 moves from the playing position to the stock position P2. Both the carriages maintain their respective vertical positions, the upper carriage 12 constantly being above the lower carriage 13. Finally, the straight line movement terminates when the lower carriage 13 reaches the stock position P2 and the upper carriage reaches the playing position as shown in FIG. 17(*b*). Subsequently, while the lower carriage 13 remains at the stock position P2 as shown in FIG. 17(*c*), the upper carriage 12 starts descending until the disk 50*a* is fully supported by the turntable 46 as shown in FIG. 18. From then on, the drawer 14, now containing the lower carriage 13 and the disk 50*b*, is pulled out of the disk player 10 from the stock position P2, as shown in FIG. 19(*a*). Finally, the side movement in the direction of P1–P2, and the up-down movement in the direction of H1–H2 is terminated when the drawer 14, containing the lower carriage 13 and the disk 50*b* is at the eject position P1. This entire process is conducted in one continuous movement while the master cam 60 rotates 270 degrees in one direction. If the driving motor 65 is rotated in a reversed direction, the above process is also reversed. Specifically, the lower carriage 13 and the upper carriage 12 are returned to the playing position and to the eject position, respectively.

Figure 19A:
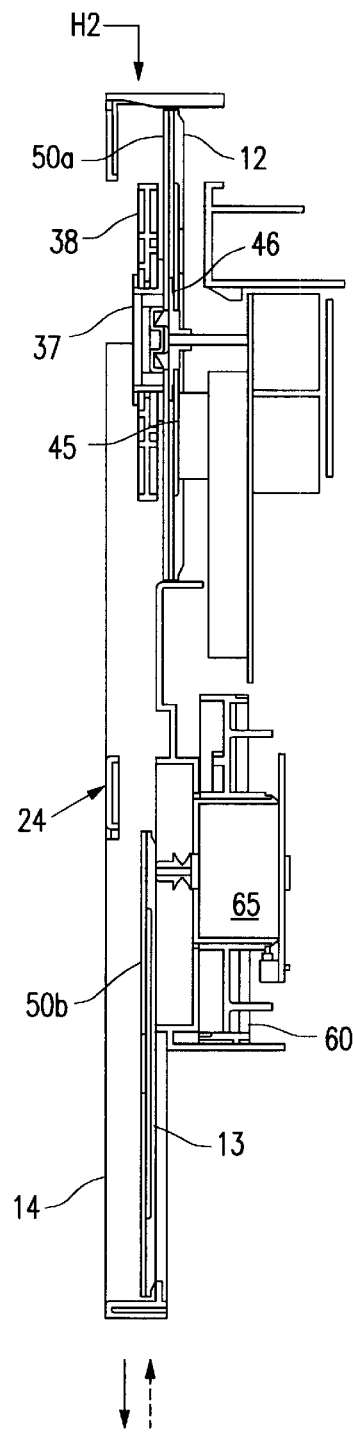
Figure 19B:
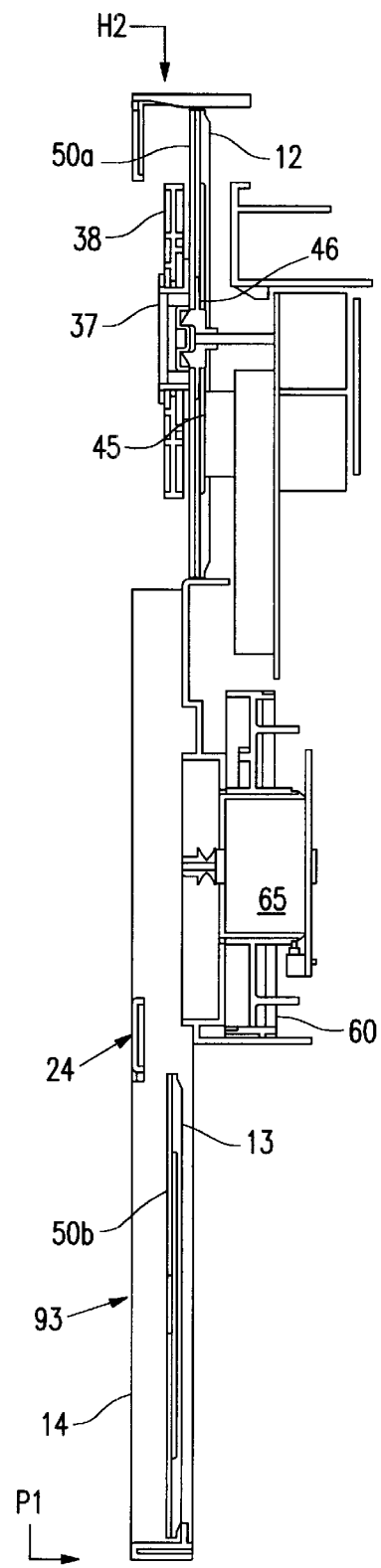
Figure 20:
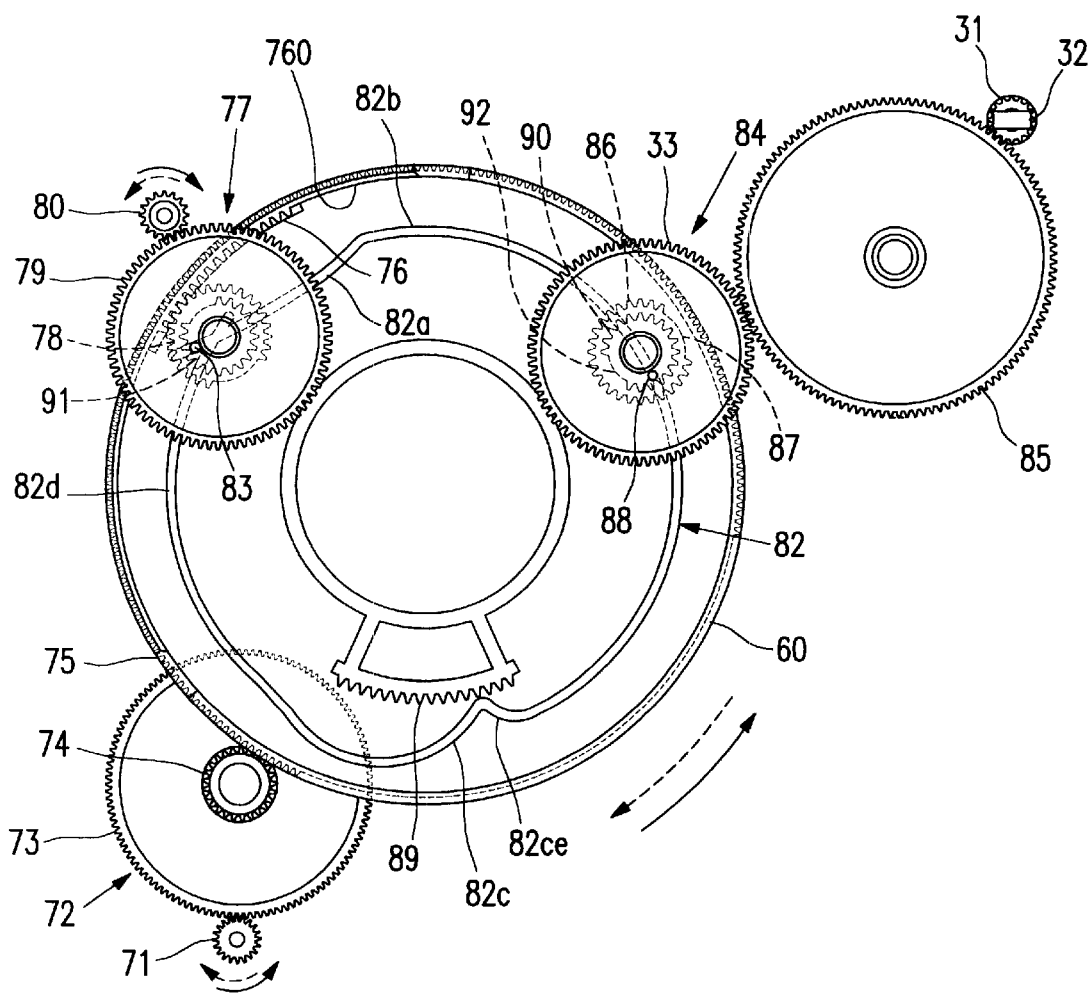
FIGS. 20–27 are plan views explaining the movements of the master cam and the line of gears of the disk player of FIG. 1.
Figure 21:
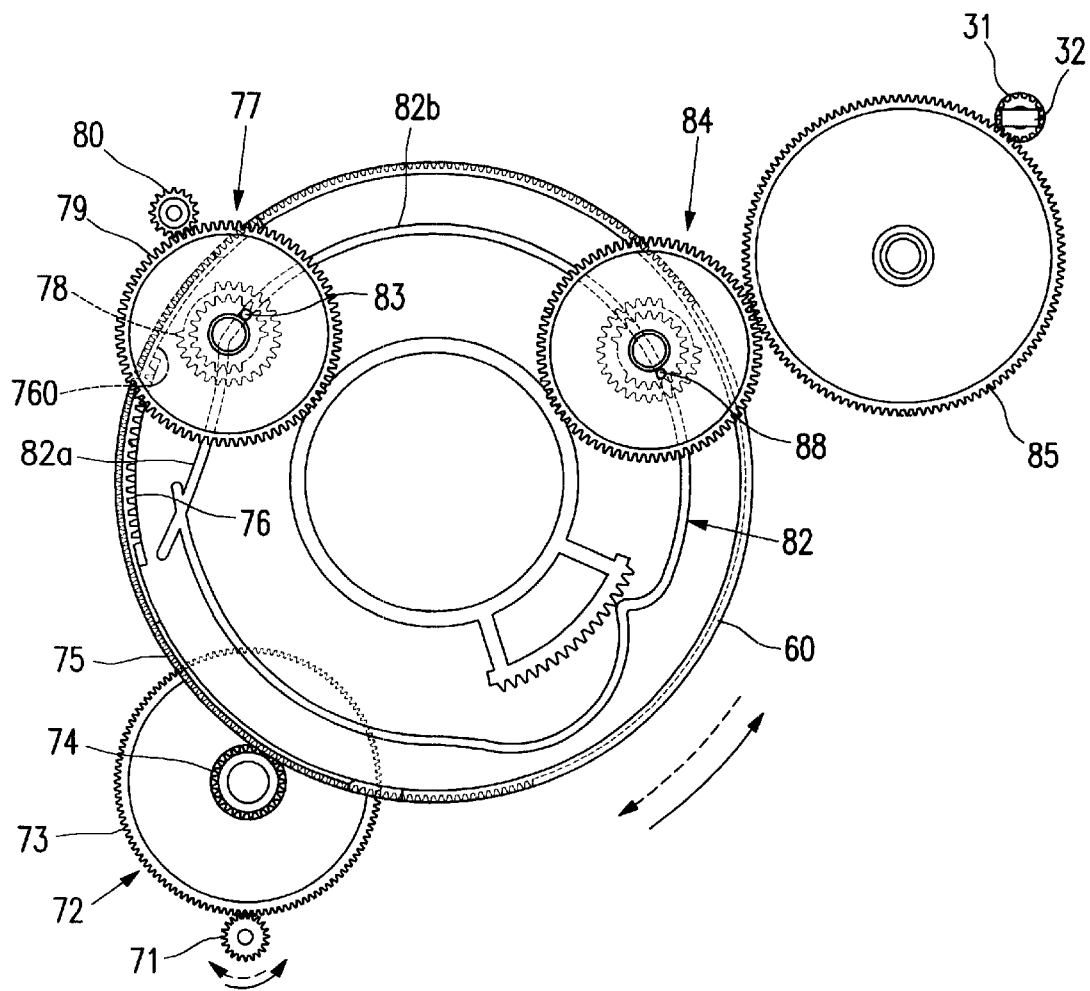

Now, with reference to FIGS. 20–27, the rotational movements of the master cam 60 and other intertwined gears will be explained for the period during which one continuous cycle of the movement of the carriages 12 and 13 is conducted. As with FIGS. 14–19. the solid lines with arrows denote the rotational direction of the master cam 60 in a counterclockwise direction, whereas the dotted lines with arrows denote the rotational direction of the master cam 60 in a clockwise direction. In FIGS. 20–21, a lacking inner teeth gear 76 (a gear having inner teeth on only parts of its circumference) of the master cam 60 engages with the middle gear 78 of a drawer operating gear pair 77, and rotates a drawer interlocking pinion 80 which is engaged with the big gear 79. FIG. 4 shows the drawer interlocking pinion 80 engaging with a drawer interlocking rack 81, which is attached to the drawer 14 by the drawer operating gear 64. The drawer operating gear 64 shares the same axis with the drawer interlocking pinion 80, and moves the drawer 14 from the eject position P1 to the stock position P2. This corresponds to the movement of the carriages as illustrated in FIGS. 14 and 15. FIGS. 20–27, however, purposefully omit the drawer operating gear 64 to simplify the drawings.

A drawer operating pin 83 engages with a rotational control cam groove 82, which protrudes from a drawer operating gear pair 77. The drawer operating pin 83 rotates along the track 82*a* of a rotational control cam groove 82, which is designed not to interfere with the rotation of the drawer operating gear pair 77, in accordance with the changes in the corresponding movements of the master cam which accompanies the rotation of the master cam 60 and the drawer operating gear pair 77. As shown in FIG. 21, an inner teeth lacking part 76*b* is a position on which the lacking inner teeth gear 76 of the master cam 60 passes through. At this position, the engagement of the middle gear 78 and the lacking inner teeth gear 76 is disengaged and the drawer operating gear pair 77 becomes free, but since the rotational control cam groove 82 enters the track 82*b* which is formed on a circle that has the same radius from the rotational center of the master cam 60, the drawer operating gear pair 77 is maintained at a condition in which the rotation is prevented due to the drawer control pin 83, which engages with the track 82*b* of the rotational control cam groove, despite the rotation of the master cam 60.

Therefore, the rotation of the drawer interlocking pinion 80 which is interlocked with the drawer operating gear pair 77 is inhibited, and the engaged drawer interlocking rack 81 locks the drawer 14 at the stock position P2. At this stock position P2, the driving pinion 21, which is placed on the drawer 14, is located at the cessation part 29 of the guide rail 26, and engages with an engaging clutch board, which is provided on the circumference of a slider moving pinion 31 of the carriage driving part 30, and of which the engaging surface is nonmovingly positioned at the sliding surface of the guide rail 26.

The slider pinion 31 which controls the engaging clutch board 32 is driven via the big gear 33 of the slider operating gear 84 through an idle gear 85. But in FIGS. 20–22, a slider control pin 88, which protrudes from the slider operating gear pair 84 and engages with the rotational control cam grove 82, is located at a track 82*b* of the rotational control cam groove 82, which is formed on the circle with the same radius from the rotational center of the master cam 60; thus, the slider control pin 88 is inhibited from rotating. This position corresponds to the position in which the engaging surface of the engaging clutch board 32 matches the sliding surface of the guide rail 26.

Figure 22:
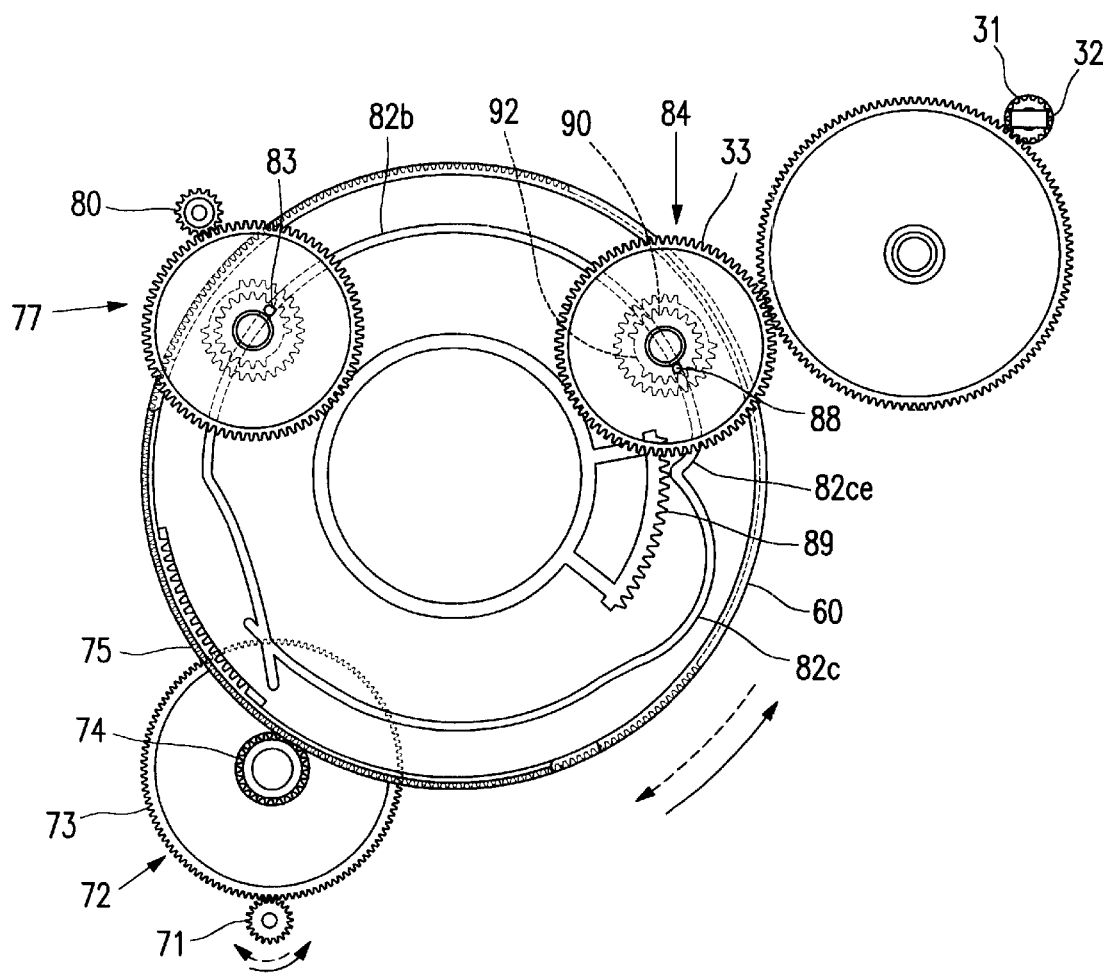

In the moving process from the position in FIG. 21 to that in FIG. 22, the lift 38 is lifted by the operation of the lever 55. The lever 55 is moved by the cam surface 61, which is provided on the master cam side surface as shown in FIG. 10. The disk 50*b* is disengaged from the disk clamper 37, then the lower carriage 13 rises, while supporting the disk 50*b* from the bottom, as shown in FIG. 16(*a*). When the lift 38 is at the upper limit position H1, the guide groove 42 on the side of the lift engages with the protruding part 43 and restricts the movement of the drawer 14 as shown in FIG. 8. The surface of the lower carriage 13 matches the moving surface of the lower slider 16, while the communicating pores 20 of the lower carriage 13 engages with the communicating pins 18 of the lower slider 16. As a result, the lower carriage 13 and the lower slider 16 are in a engagement state as shown in FIG. 16(*b*).

Figure 23:
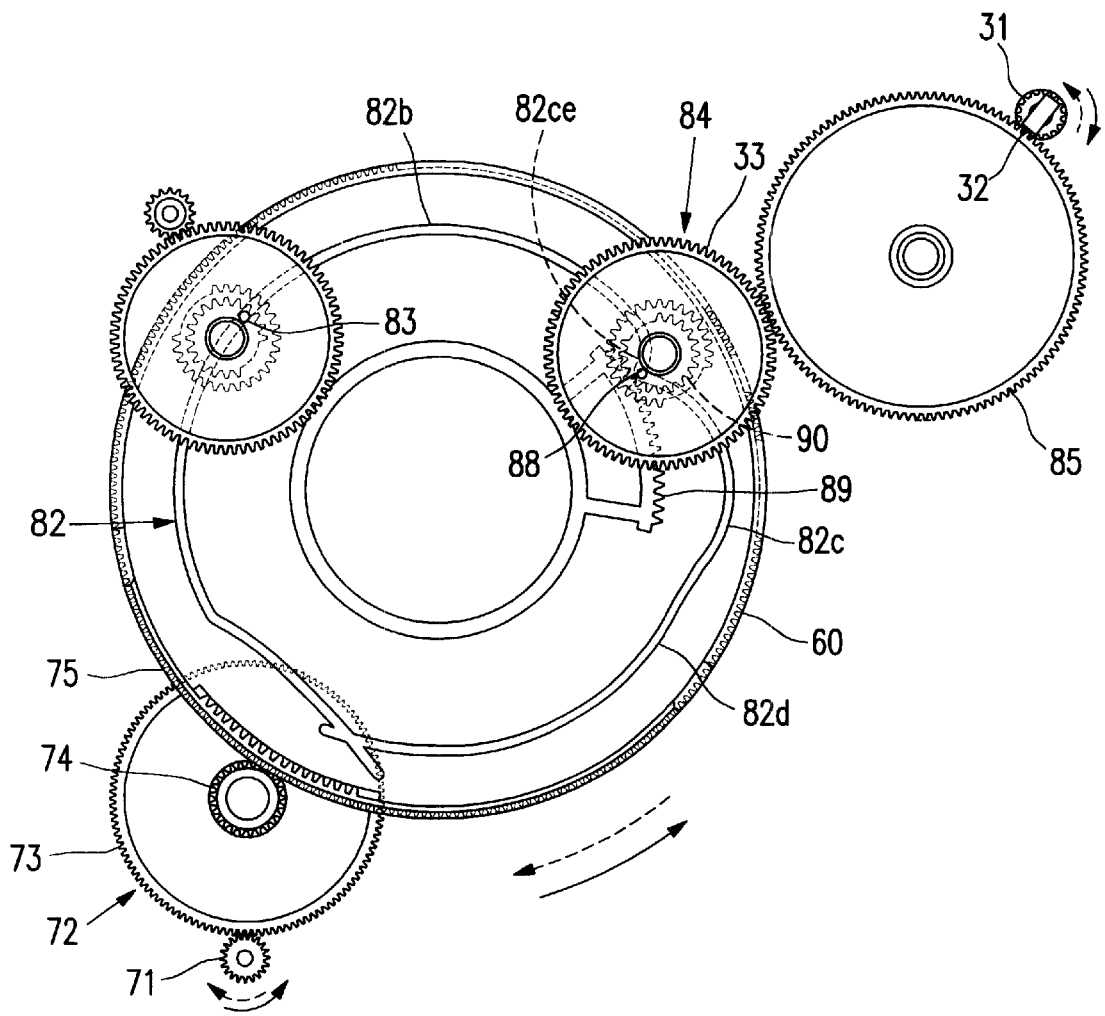
Figure 24:
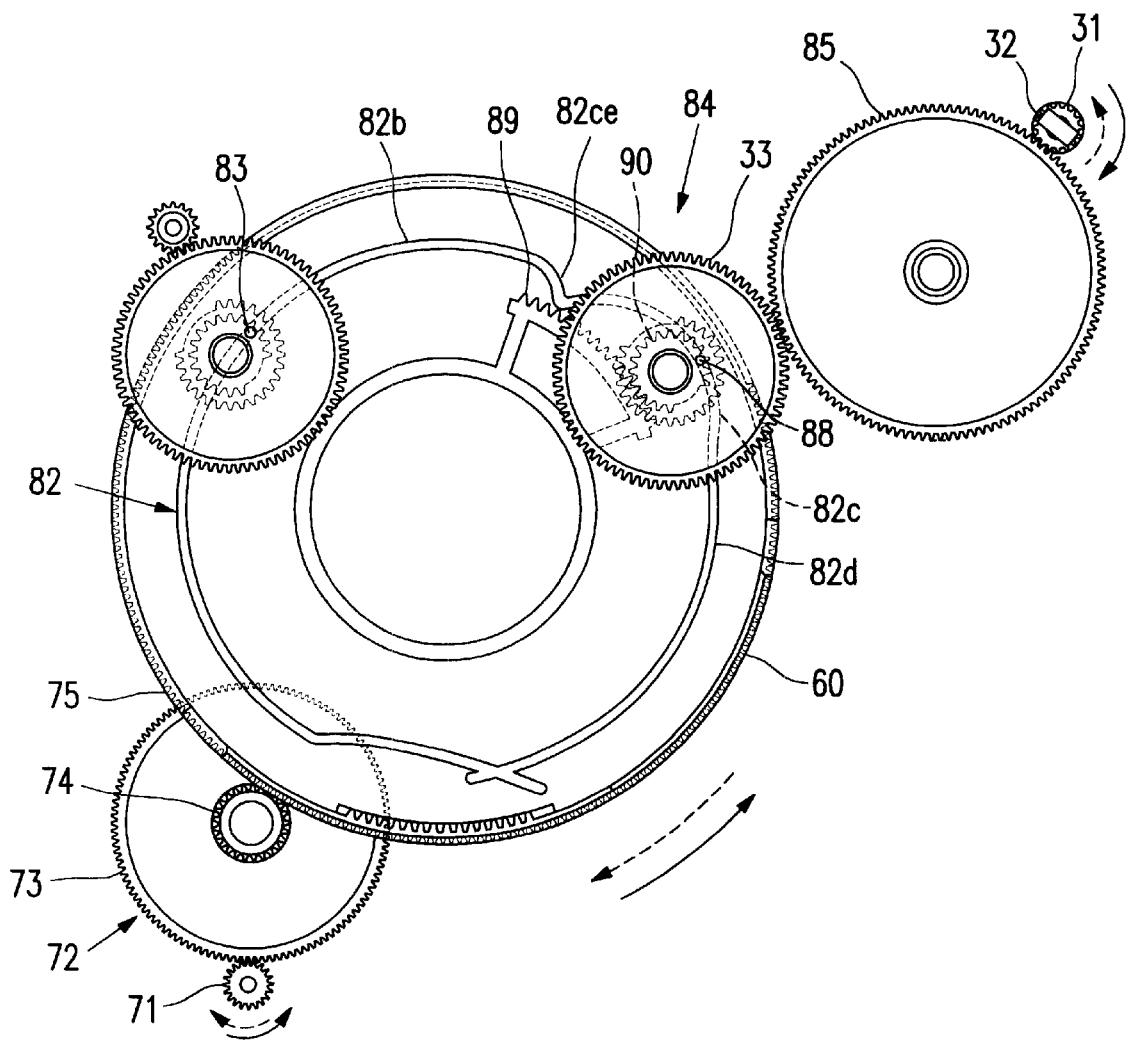

As shown in FIGS. 23–24, a sector gear 89 engages with a small gear 90 of a slider operating gear pair 84. In accordance with the changes in the corresponding movements of the master cam 60 which accompanies the rotation of the master cam 60 and the slider operating gear pair 84, a slider control pin 88, which protrudes from the slider operating gear pair 84 and is engaged with a rotational control cam groove 82, rotates along the track 82c of a rotational control cam groove 82. The groove 82 is designed not to interfere with the rotation of the slider operating gear pair 84. The beginning part of the track 82c is denoted as 82ce. The part 82ce actively rotates the slider control pin 88, and guarantees that the movement from the teeth lacking part 92 of the small gears 90 and 91 to the engagement with the sector gear 89 is smoothly and surely performed.

The rotation of this slider operating gear pair 84 is communicated from the big gear 33 via the idle gear 85 to the slider moving pinion 31. Then, as shown in FIGS. 17(a) and (b), the sliders 15 and 16 switch positions from front to back and vice versa, as a result of the operation of the line of gears 24 which is set up in the drawer 14 as stated earlier, the lower slider 16 pulls forward the lower carriage 13 from the lower shelf 41 of the lift 38, and the upper slider 15 stores the upper carriage 12 into the upper shelf 40 of the lift 38. A track 82d is formed on the circle with the same radius from the rotational center of the master cam 60, and is designed so that the engaging surface matches the sliding surface of the guide rail 26. Furthermore, in this instance, the teeth lacking part 87 of the middle gear faces the inner side of the master cam 60 on which the lacking teeth gear 76 is formed, the middle gear 86 of the slider operating gear pair 84 does not communicate the rotation to the driving pinion 21 by engaging the middle gear 86 of the slider operating gear pair with the lacking teeth gear 76 which was rotated by the rotation of the master cam 60.

Figure 25:
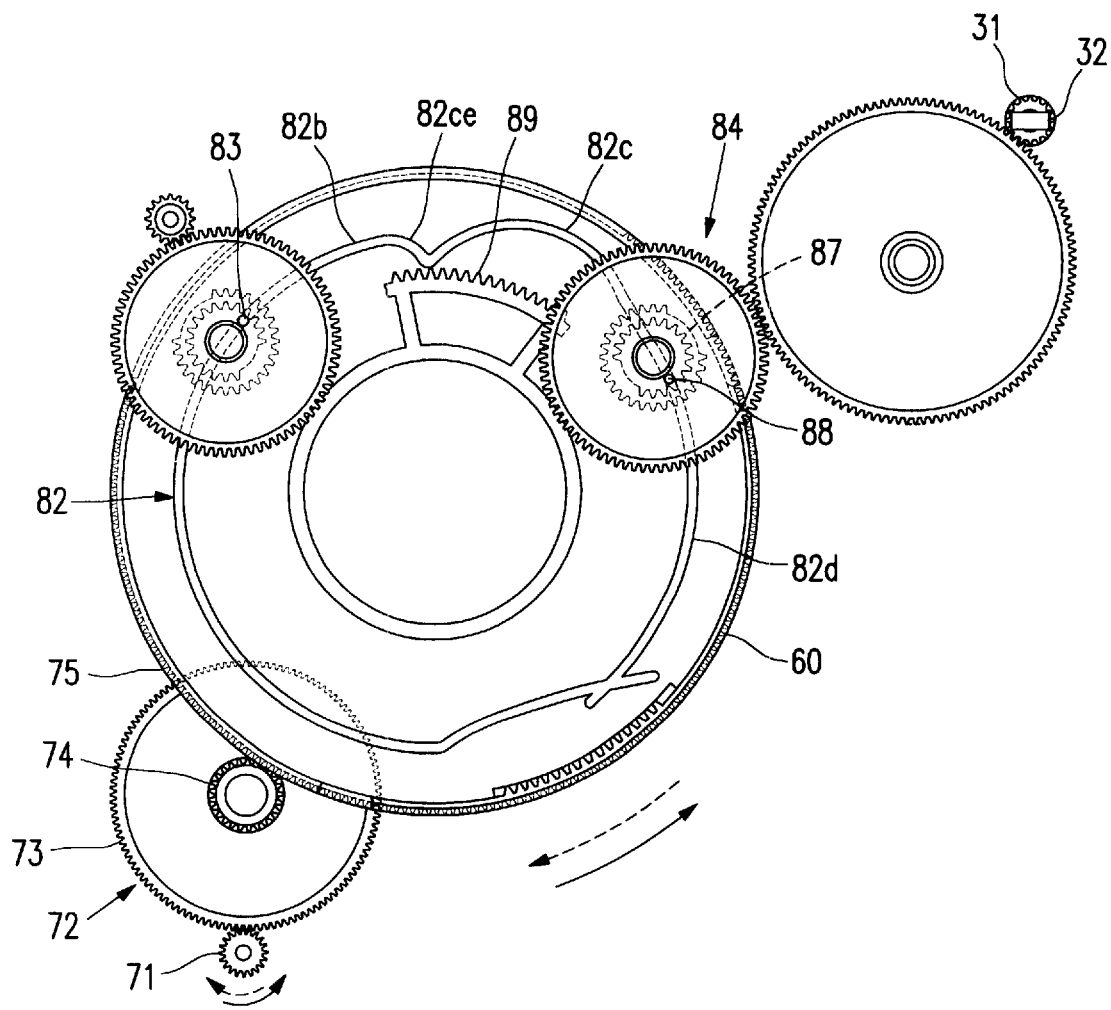
Figure 26:
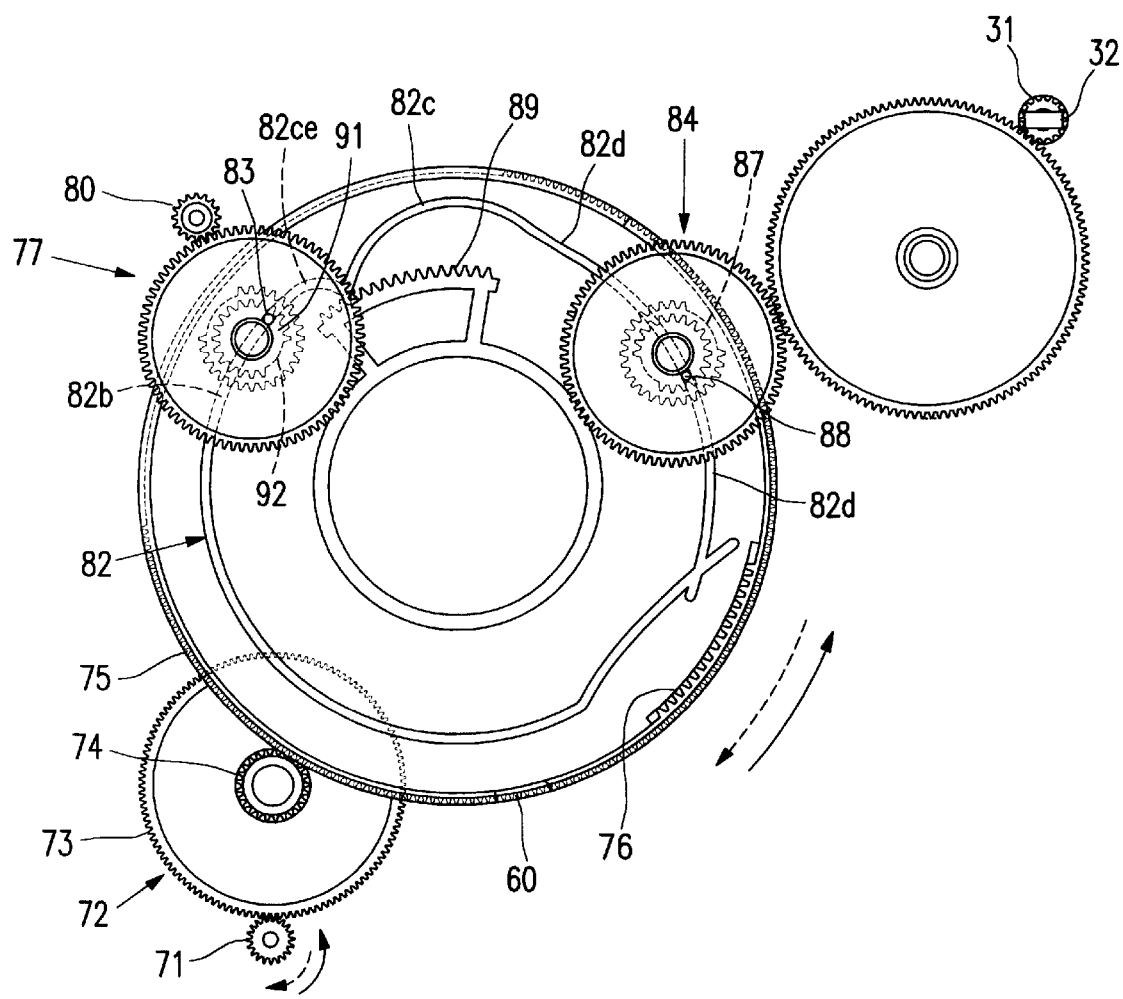

In the process of moving from the position in FIG. 25 to that in FIG. 26, the lift 38 is descended by the operation of the lever 55 and moved by the cam surface placed on the side surface of the master cam 60. Subsequently, the engagement of the protruding part 43 of the drawer and the guide rail 42 of the lift is disengaged. During this descent, the communicating pores 19 of the upper carriage 12 are separated from the communicating pins 17 of the upper slider 15, then the upper carriage 12 descends, while supporting the disk 50a as shown in FIG. 17(c). The upper carriage then switches places with the turntable 46 so that the turntable 46 is now supporting the disk 50a, and is separated from the bottom side of the disk 50a. Finally, as shown in FIG. 18, when the lift 38 reaches the lower limit position H2, the disk clamper 37 sets the disk 50a onto the turntable 46.

Figure 27:
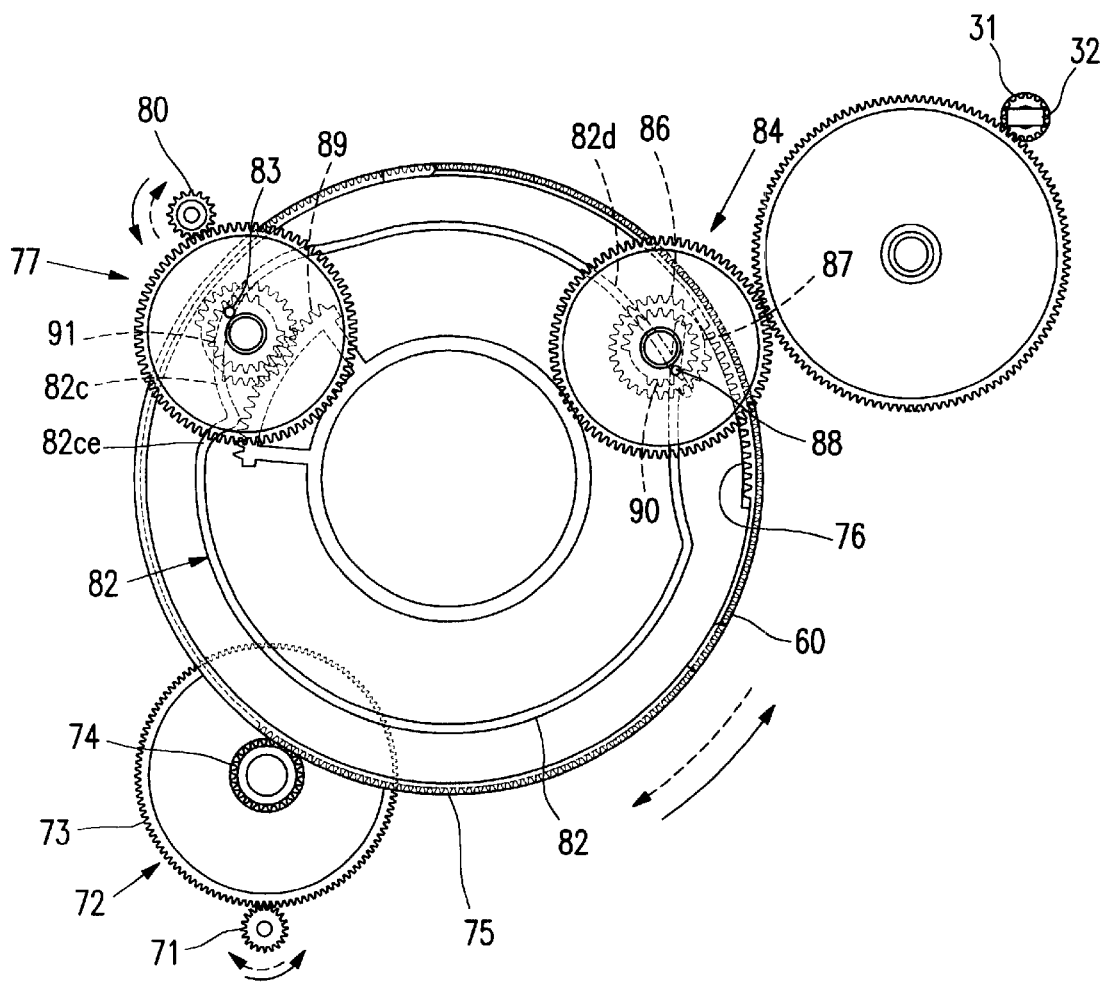

As shown in FIG. 27, the sector gear 89 engages with the small gear 91 of the drawer operating gear pair 77. The drawer control pin 83 operates in the same way as the slider control pin 99, and rotates along the tracks 82ce and 82c which correspond to the sector gear 89. As mentioned above, the track 82ce functions as to accomplish the move of the teeth lacking part 92 of the small gear 91 and its engagement with the sector gear 89. The track 82c is a part of the rotational control cam groove 82, which functions as not to interfere with the rotation of the drawer operating gear pair 77, according to the changes of the corresponding structure of the master cam 60. The clockwise rotation of the drawer operating gear pair 77 rotates the drawer interlocking pinion 80 in a counterclockwise direction, and drives the engaged drawer interlocking rack 81 to move the drawer 14 to the eject position P1, as can be seen in FIGS. 19(a) and (b).

In this instance, the guide rail 26 restricts the rotation of the driving pinion 21, and the lower slider 16, to which the lower rack 28 engaged with the driving pinion 21 is attached, and the upper slider 15, to which the upper rack 27 engaged with the middle pinion 22 is attached, are both fixed at their corresponding positions and move with the drawer 14 to the eject position P1. At this position P1, the disk 50b, which is set on the lower carriage 13 connected to the lower slider 16 faces an opening 93, which opens up from the upper surface of the drawer 14. Thus, the disk can be taken out or changed easily from this upper part of the drawer 14 as shown in FIG. 19(b).

Figure 13:
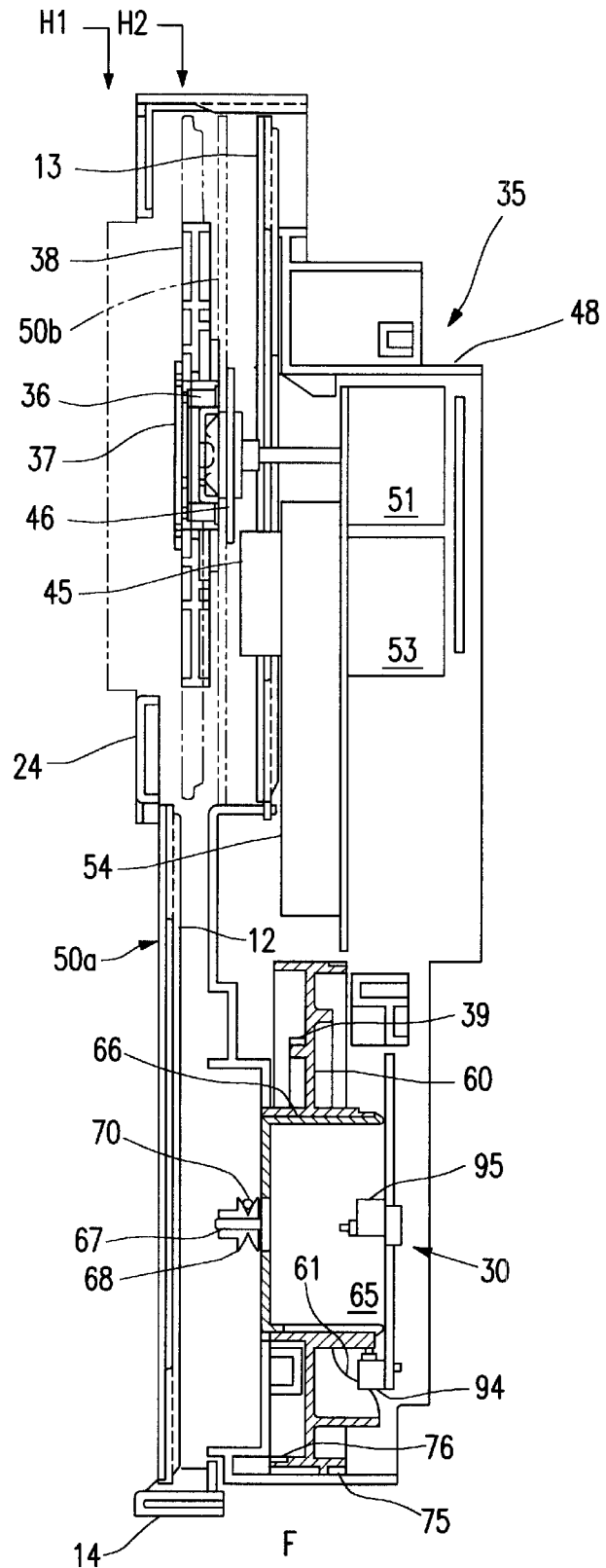
FIG. 13 is a side view of the disk player, illustrating the first disk mode.

Apparent from the above explanation, the angle of the rotation of the master cam 60 determines the positions of the drawer 14 between the eject position P1 and the stock position P2, as well as the positions of the slider 15 and 16 between front and back. As shown in FIG. 13, limit switches 94 and 95 are placed at appropriate positions corresponding to the angles of the rotation, and each of motors 51, 53 and 65, is interlocked with a separately installed switch and an indicating lamp, not shown.

The operation of the player according to an embodiment of the present invention will now be described. Normally, when the disk player 10 is not in use, the drawer 14 is at the stock position P2, the carriages 12 and 13 are in the first disk mode as illustrated in FIGS. 13 and 15, or in the second disk mode, as shown in FIG. 18. In the first disk mode, the lower carriage 13, together with the lift 38, is at the lower limit position H2, whereas, in the second disk mode, the upper carriage 12, together with the lift 38, is at the lower limit position H2.

Moreover, in the first disk mode, the master cam 60 operates one of the limit switches and stays put as shown in FIG. 21. Similarly, in the second disk mode, the master cam 60 operates another one of the limit switches and stays put as shown in FIG. 26. When the player 10 is in other positions and the power is turned on, the driving motor 65 selects one of the disk modes and stops, and then, transmits a stop signal or determines whether the upper lower carriage 12 or 13 is in one of the disk modes. In this instance, a method well known in the art may be used to determine whether there is a disk or not in the disk player 10.

In order to load or change a disk, an eject activating mechanism such as an eject switch corresponding to each disk may be operated. When the master cam 60 is in the first disk mode, and the first disk eject switch is operated, the driving motor 65 rotates in a clockwise direction, whereas, in the same situation but the second disk eject switch is operated, the driving motor 65 rotates in a counterclockwise direction. In both instances, the drawer 14 is moved to the eject position P1 as shown in FIG. 14(a) or FIG. 19(b). When the disk 50 is placed on one of the carriages 12 or 13 that faces the opening 93 of the drawer 14, the drawer 14 is returned to the stock position P2 by operating once again the eject switch and reverse rotating the driving motor 65.

As explained above, when the power is turned on, the player is set at either the first disk mode or the second disk mode. The disk mode may be changed by operating a disk mode activating mechanism, such as a disk mode switch. Switching from the first disk mode to the second disk mode rotates the master cam 60 in a counterclockwise direction as shown from FIGS. 21–26. On the other hand, switching from the second disk mode to the first disk mode rotates the master cam 60 in a clockwise direction through a sequence of movements in a reverse order as that shown in FIGS. 21–26.

Figure 16A:
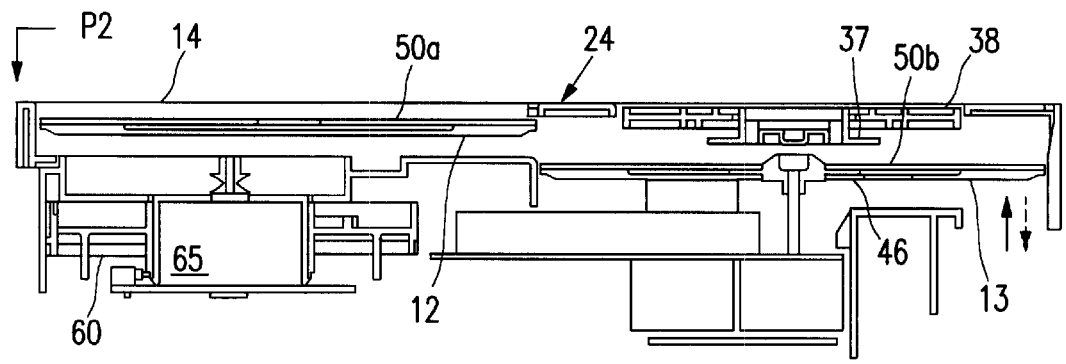
Figure 16B:
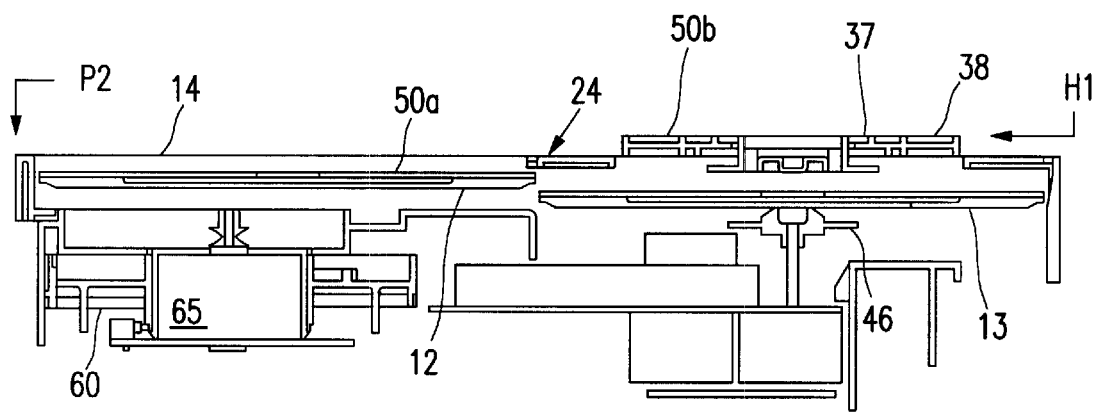
Figure 17A:
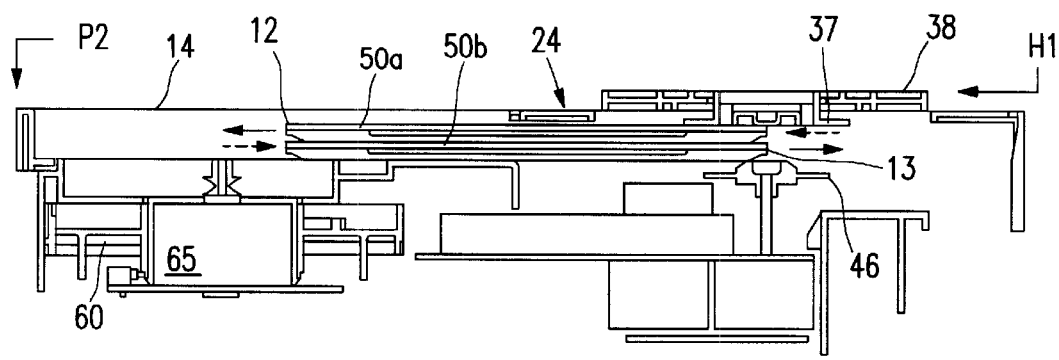
Figure 17B:
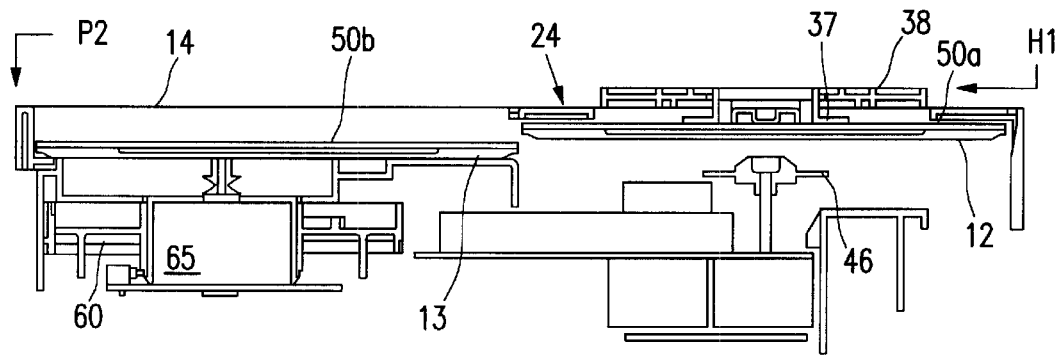
Figure 17C:
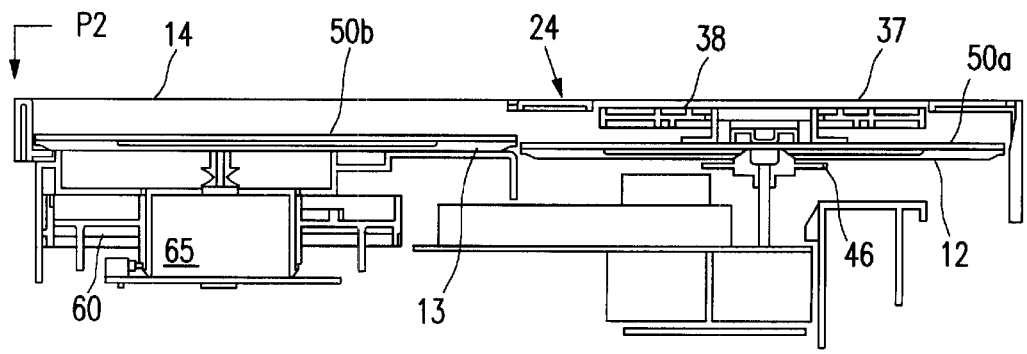
Figure 18:
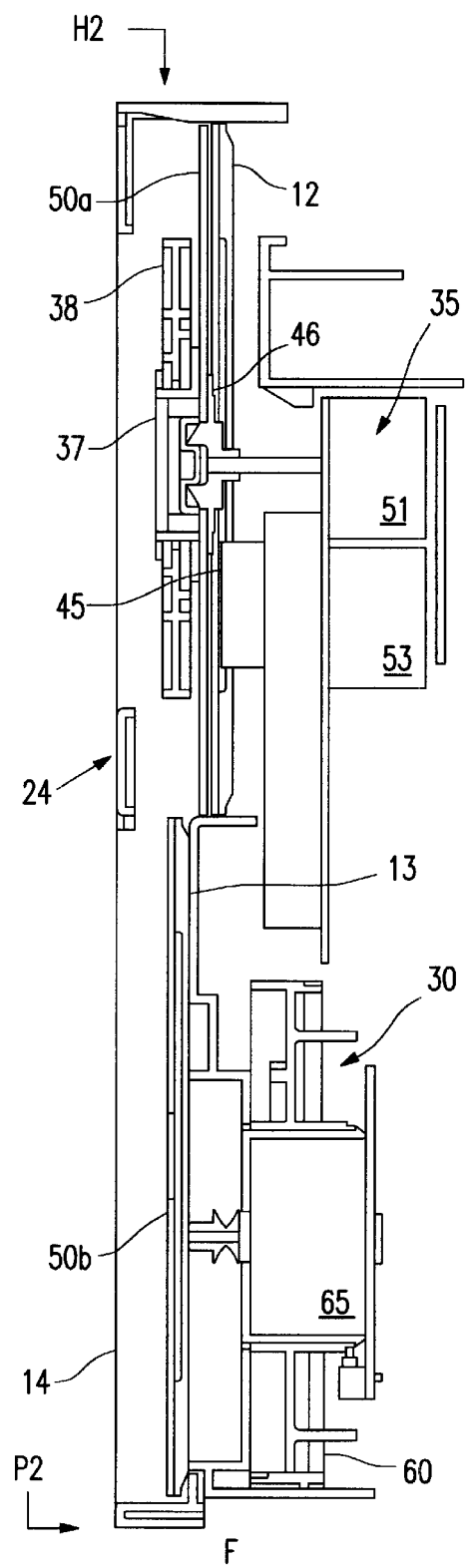

Accordingly, switching from the first disk mode, shown in FIG. 15, to the second disk mode, shown in FIG. 18, occurs as follows: first, the ascent of the lift 38 causes the disk 50b to be separated from the disk clamper 37; second, the disk 50b is lifted onto the carriage 13, as shown in FIG. 16(a); third, the lift 38 reaches the upper limit position H1 and the height of the carriage 13 matches the horizontal movement surface, as shown in FIG. 16(b); fourth, the upper slider 15 switches places with the lower slider 16 from front to back; fifth, the carriage 12, on which the disk 50a is placed, is inserted into the upper shelf 40 of the lift, which waits at the upper limit position H1, as shown in FIG. 17(b); sixth, the lift 38 begins its descent, as shown in FIG. 17(c); seventh, the lift 38 reaches the lower limit position H2 and the disk clamper 37 places the disk 50a onto the turntable 46, as shown in FIG. 18.

On the other hand, switching from the second disk mode, shown in FIG. 18, to the first disk mode, as shown in FIG. 15, occurs as follows: first, the ascent of the lift 38 causes the disk 50a to be separated from the disk clamper 37; second, the disk 50a is lifted onto the carriage 12, as shown in FIG. 17(c); third, the lift 38 reaches the upper limit position H1 and the height of the carriage 12 matches the horizontal movement surface, as shown in FIG. 17(b); fourth, the upper slider 15 switches places with the lower slider 16 from front to back; fifth, the carriage 13, on which the disk 50b is placed, is inserted into the lower shelf 41 of the lift, which waits at the upper limit position H1 as shown in FIG. 16(b); sixth, the lift 38 begins its descent as shown in FIG. 16(a); seventh, the lift 38 reaches the lower limit position H2 and the disk clamper 37 places the disk 50b onto the turntable 46 as shown in FIG. 15.

In this manner, after selecting either the first or the second disk mode, the playing operation is performed in accordance with the appropriate playing mode. Although not illustrated in the figures, it is preferred that the eject switch and the disk mode switch should be some kind of push buttons, which are placed at appropriate places of the disk player 10, and of which the circuit can be switched off after each use. Those skilled in the art will readily recognize that other eject and disk mode activating mechanisms may be used, such as remote control or the like.

Figure 28:
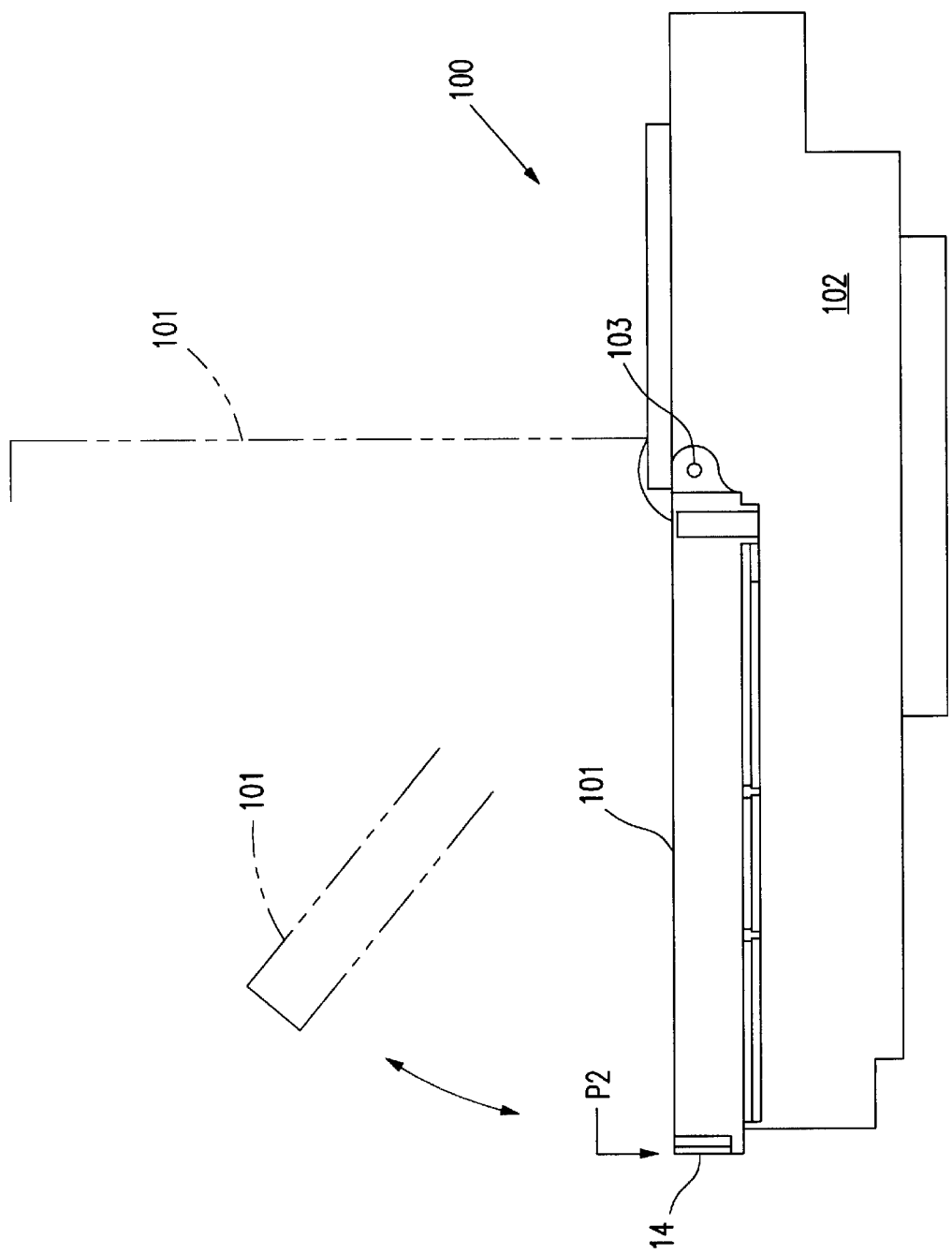
FIG. 28 is a side view schematically illustrating a disk player according to another embodiment of the present invention.

An alternative embodiment of the present invention is shown in FIG. 28. In this embodiment, an upper casing 101 of the drawer 14 of a disk player 100 is hinged with a supporting axis 103 to a side board 102, wherein the upper casing 101 may be freely opened to an angled or the upper direction. Thus, without pulling the drawer 14 forward, the upper casing 101 can be opened and the disk can be removed or replaced, through the upper part of the drawer 14 which is at the stock position P2. This is useful when there is little room in the front of the disk player 100. In this case, the mechanism for sliding the drawer 14 is not necessary; indeed, there need not be a drawer structurally distinct from the frame, although the part that the sliders are mounted to may still be referred to as a drawer for convenience. All of the other structures of the disk player 100 may be the same as the structures of the disk player 10 as shown in FIGS. 12–27; thus, the explanation is omitted here.

The two embodiments described above were introduced only to describe the conditions of the actual operation of the invention, and they do not limit the range of the claims of the disclosed invention. Other structural components and functionalities, such as volume control and programming features including forward, repeat, shuffle, etc. may be provided for the disk player according to embodiments of the present invention. Such features are well known in the art and will not be described here.

It will be apparent to those skilled in the art that various modifications and variations can be made to the disk player and disk changer of the illustrated embodiments without departing from the spirit or scope of the inventions. For example, a disk player capable of storing three or more disks can be made without departing from the spirit or scope of the invention. Further, although the drawer is shown to have a front and back portion for storing the two disks and both the eject motion and the position exchange motion of the carriages are along the longitudinal direction, the drawer can also be oriented sideways so that the two carriages exchange their positions in a direction perpendicular to the eject direction. In addition, while the cam and gear structures of the disk player are described in considerable detail, those skilled in the art will appreciate that many variations and modifications of the described structures are possible. Thus, it is intended that the present invention covers the modifications and variations of this invention provided they come within the scope of the appended claims and equivalents.

What is claimed is:

1. A disk changer for a disk player, comprising:

a drawer having a front and a back portion defining a longitudinal direction;

first and second sliders attached to the drawer and movable in the longitudinal direction;

first and second carriages each for carrying a disk, each carriage being engageable with one of the first and second sliders, wherein when both carriages are engaged with the respective slider, the carriages are vertically displaced with respect to each other and moveable longitudinally between the front and back portions within the drawer;

a control mechanism for effectuating the movements of the sliders; and a lifting mechanism for vertically moving the first and second carriages whichever is located in the back portion;

wherein each of the first and second carriage is operable to carry its disk to a common location at which the disk is played, and wherein the control mechanism and the lifting mechanism are both effectuated by a single drive motor.

2. The disk changer of claim 1, wherein the control mechanism effectuates simultaneous movements of one of the first and second sliders from the front portion to the back portion and the other one of the first and second sliders from the back portion to the front portion.

3. The disk changer of claim 1, wherein the control mechanism effectuates and synchronizes the movements of the sliders and the lifting mechanism.

4. The disk changer of claim 1, further comprising a turntable, wherein the lifting mechanism places a disk carried by the carriage located in the back portion on to the turntable for playing and removes a disk from the turntable and replaces it onto the carriage located in the back portion.

5. The disk changer of claim 4, further comprising a locking mechanism for preventing the movement of the sliders when a disk is placed on the turntable.

6. The disk changer of claim 4, wherein the control mechanism comprises a cam system.

7. The disk changer of claim 6, wherein the cam system comprises a master cam, and wherein the control mechanism effectuates simultaneous movements of the first carriage from the front portion to the back portion and the second carriage from the back portion to the front portion, and a subsequent movement of the lifting mechanism to place a disk carried by the first carriage onto the turntable during a rotation of the master cam in a first direction.

8. The disk changer of claim 1, wherein the control mechanism effectuates a movement of the lifting mechanism to replace a disk carried by the turntable onto the first carriage, and subsequent simultaneous movements of the first carriage from the back portion to the front portion and of the second carriage from the front portion to the back portion during a rotation of the master cam in a second direction.

9. The disk changer of claim 1, further comprising a frame, wherein the drawer is longitudinally moveable with respect to the frame between a retreated position where the drawer is enclosed within the frame and an ejected position where the front portion of the drawer is located outside of the frame.

10. The disk changer of claim 9, wherein the control mechanism effectuates and synchronizes the movements of the drawer and the sliders.

11. The disk changer of claim 10, further comprising a locking mechanism for preventing the movements of the sliders when the drawer is in the ejected position.

12. The disk changer of claim 10, wherein the control mechanism comprises a cam system.

13. The disk changer of claim 12, wherein the cam system comprises a master cam, and wherein the control mechanism effectuates simultaneous movement of the first carriage from the front portion to the back portion and the second carriage from the back portion to the front portion, and a subsequent movement of the drawer from the retreated position to the ejected position during a rotation of the master cam in a first direction.

14. The disk changer of claim 13, wherein the control mechanism effectuates a movement of the drawer from the ejected position to the retreated position, and subsequent simultaneous movements of the first carriage from the back portion to the front portion and the second carriage from the front portion to the back portion during a rotation of the master cam in a second direction.

15. A disk player, comprising:
  a frame;
  a drawer having a front and a back portion along a longitudinal direction, the drawer being longitudinally movable with respect to the frame between a retreated position where the drawer is enclosed within the frame and an ejected position where the front portion of the drawer is located outside of the frame;
  first and second sliders attached to the drawer and moveable in the longitudinal direction;
  first and second carriages each for carrying a disk, each carriage being engageable with a slider, wherein when both carriages are engaged with the respective slider, the carriages are vertically displaced with respect to each other and moveable longitudinally between the front and back portions of the drawer;
  a turntable located adjacent to the back portion of the drawer when the drawer is in the retreated position;
  a lifting mechanism for vertically moving the first and second carriages whichever is located in the back portion for placing the disk carried by the carriage onto the turntable; and
  a control mechanism having a cam system for effectuating and synchronizing the movements of the drawer, the sliders, and the lift mechanism wherein the control mechanism and the lifting mechanism are both effectuated by a single drive motor.

16. The disk player of claim 15, wherein the cam system comprises a master cam, and wherein the control mechanism effectuates the movement of the drawer from the ejected position to the retreated position, subsequent simultaneous movements of the first carriage from the front portion to the back portion and the second carriage from the back portion to the front portion, and a subsequent movement of the lifting mechanism to place a disk carried by the first carriage on to the turntable during a rotation of the master cam in a first direction.

17. The disk player of claim 15, wherein the cam system comprises a master cam, and wherein the control mechanism effectuates the movement of the lifting mechanism to replace a disk carried by the turntable on to the first carriage, subsequent simultaneous movements of the first carriage from the back portion to the front portion and the second carriage from the front portion to the back portion, and a subsequent movement of the drawer from the retreated position to the ejected position during a rotation of the master cam in a second direction.

18. A disk player, comprising:
  a drawer having a front and a back portion along a longitudinal direction;
  a casing located above the front portion of the drawer and moveable between a closed position where the front portion is covered and an open position where the front portion is exposed;
  first and second sliders attached to the drawer and moveable in the longitudinal direction;
  first and second carriages located within the drawer each for carrying a disk, each carriage being engageable with a slider, wherein when both carriages are engaged with the respective slider, the carriages are vertically displaced with respect to each other and moveable longitudinally between the front and back portions of the drawer;
  a turntable located adjacent to the back portion of the drawer;
  a lifting mechanism for vertically moving the first and second carriages whichever is located in the back portion for placing a disk carried by the carriage on to the turntable; and
  a control mechanism having a cam system for effectuating and synchronizing the movements of the casing, the sliders, and the lifting mechanism wherein the control mechanism and the lifting mechanism are both effectuated by a single drive motor.

19. The disk player of claim 18, wherein the cam system comprises a master cam, and wherein the control mechanism effectuates the movement of the casing from the open position to the closed position, subsequent simultaneous movements of the first carriage from the front portion to the back portion and of the second carriage from the back portion to the front portion, and a subsequent movement of the lifting mechanism to place a disk carried by the first carriage on to the turntable during a rotation of the master cam in a first direction.

20. The disk player of claim 18, wherein the cam system comprises a master cam, and wherein the control mechanism effectuates the movement of the lifting mechanism to replace a disk carried by the turntable on to the first carriage, subsequent simultaneous movements of the first carriage from the back portion to the front portion and of the second carriage from the front portion to the back portion, and a subsequent movement of the casing from the closed position to the open position during a rotation of the master cam in a second direction.

21. A method of changing disks in a disk player, comprising:
  (a) removing a first disk from a turntable where the first disk was played to place it on a first carriage located in a back portion of a drawer;

(b) simultaneously moving the first carriage from the back portion to a front portion and moving a second carriage carrying a second disk from the front portion to the back portion, wherein the first and second carriages are moved by a lifting mechanism and are vertically spaced apart during the movements wherein the moving of the first carriage from the back portion to the front portion, the moving of the second carriage from the front portion to the back portion, and lifting of the second carriage are effectuated by a single drive motor; and (c) placing the second disk carried by the second carriage onto the turntable.

22. The method of claim 21, wherein the carriage movements in step (b) are linear.

23. The method of claim 21, wherein the step (a) comprises vertically moving the first carriage and the step (c) comprises vertically moving the second carriage.

24. The method of claim 21, further comprising:
(d) prior to the step (b), placing the second disk on to the second carriage; and
(e) after the step (b), removing the first disk from the first carriage.

25. The method of claim 21, further comprising:
(f) prior to the step (b), making the disk carried on the second carriage accessible to a user; and
(g) after the step (b), making the disk carried on the first carriage accessible to the user.

26. The method of claim 25, wherein the steps (a), (b) and (g) are performed sequentially by a control system having a master cam during a rotation of the master cam in a first direction.

27. The method of claim 25, wherein the steps (f), (b) and (c) are performed sequentially by a control system having a master cam during a rotation of the master cam in a second direction.

28. The method of claim 25, wherein the steps (f) and (g) comprise ejecting the front portion of the drawer from the disk player.

29. The method of claim 25, wherein the steps (f) and (g) comprise opening a casing that covers the front portion of the drawer.

30. A disk changer for a disk player, comprising:

a drawer having a front and a back portion defining a longitudinal direction;

first and second sliders attached to the drawer and moveable in the longitudinal direction;

first and second carriages each for carrying a disk, each carriage being engageable with one of the first and second sliders, wherein when both carriages are engaged with the respective slider, the carriages are vertically displaced with respect to each other and moveable longitudinally between the front and back portions within the drawer;

control means for effectuating the movements of the sliders; and a lifting mechanism for vertically moving the first and second carriages whichever is located in the back portion;

wherein each of the first and second carriages is operable to carry its disk to a common location at which the disk is played, and wherein the control means and the lifting mechanism are both effectuated by a single drive motor.

* * * * *